US011817923B2

(12) United States Patent
Wang et al.

(10) Patent No.: US 11,817,923 B2
(45) Date of Patent: Nov. 14, 2023

(54) PRECODING OF MASSIVE MIMO

(71) Applicant: NOKIA SOLUTIONS AND NETWORKS OY, Espoo (FI)

(72) Inventors: Lijun Wang, Zhejiang (CN); Weiqiang Mao, Zhejiang (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 3 days.

(21) Appl. No.: 17/442,873

(22) PCT Filed: Mar. 25, 2019

(86) PCT No.: PCT/CN2019/079572
§ 371 (c)(1),
(2) Date: Sep. 24, 2021

(87) PCT Pub. No.: WO2020/191591
PCT Pub. Date: Oct. 1, 2020

(65) Prior Publication Data
US 2022/0190887 A1    Jun. 16, 2022

(51) Int. Cl.
*H04B 7/02*         (2018.01)
*H04B 7/0426*       (2017.01)
(Continued)

(52) U.S. Cl.
CPC ......... *H04B 7/0426* (2013.01); *H04B 7/0456* (2013.01); *H04L 27/2614* (2013.01); *H04W 52/0206* (2013.01)

(58) Field of Classification Search
CPC . H04B 7/0426; H04B 7/0456; H04L 27/2614; H04W 52/0206
(Continued)

(56) References Cited

U.S. PATENT DOCUMENTS

2015/0358055 A1    12/2015  Molisch et al.
2016/0329936 A1*   11/2016  Walton ..................... H04L 1/06
(Continued)

FOREIGN PATENT DOCUMENTS

CN    101697509 A    4/2010
CN    108462517 A    8/2018
(Continued)

OTHER PUBLICATIONS

International Search Report and Written Opinion dated Jan. 8, 2020, corresponding to International Patent Application No. PCT/CN2019/079572.
(Continued)

*Primary Examiner* — Zewdu A Kassa
(74) *Attorney, Agent, or Firm* — SQUIRE PATTON BOGGS (US) LLP

(57) ABSTRACT

Embodiments of the present disclosure relate to a method, transmitter, apparatus and computer readable storage media for signal precoding of massive MIMO. The transmitter comprises a first number of transmitting antennas. In example embodiments, the transmitter iteratively performs the following operations: determining a first number of signals to be transmitted by the first number of antennas in a second number of streams based on a second number of original signals, determining whether at least one feature of the first number of signals is to be regulated, and in response to determining that the at least one feature of the first number of signals is to be regulated, adjusting at least one of the first number of signals in order to regulate the at least one feature of the first number of signals. Accordingly, the first number of signals are transmitted by the first number of antennas in the second number of streams.

15 Claims, 11 Drawing Sheets

(51) Int. Cl.
  *H04B 7/0456* (2017.01)
  *H04L 27/26* (2006.01)
  *H04W 52/02* (2009.01)

(58) Field of Classification Search
  USPC ........ 375/267, 262, 261, 259, 219, 295, 316
  See application file for complete search history.

(56) References Cited

U.S. PATENT DOCUMENTS

2017/0041869 A1    2/2017  Homchaudhuri et al.
2019/0132156 A1*   5/2019  Wang .................. H04L 25/0224

FOREIGN PATENT DOCUMENTS

WO    2004/036767 A2    4/2004
WO    2017/160052 A2    9/2017

OTHER PUBLICATIONS

Extended European Search Report dated Sep. 28, 2022, corresponding to European Patent Application No. 19922075.7.
Zayani Rafik et al: "PAPR-Aware Massive MIMO-OFDM Downlink", IEEE Access, vol. 7, Mar. 8, 2019 (Mar. 8, 2019), pp. 25474-25484.
First Examination Report dated Mar. 25, 2022 corresponding to Indian Patent Application No. 202147048024.
Chinese Office Action issued in corresponding Chinese Patent Application No. 201980096469.0 dated Jul. 28, 2023.

* cited by examiner

PRECODING OF MASSIVE MIMO

TECHNICAL FIELD

Embodiments of the present disclosure generally relate to the field of telecommunication, and in particular, to a method, transmitter, apparatus and computer readable storage media for signal precoding of Massive Multiple-Input Multiple-Output (MIMO).

BACKGROUND

The Massive MIMO technology is considered to be an important technology in a future fifth-generation (5G) communications system. It is mainly used to improve the spectrum efficiency and power efficiency of the communication system. With the Massive MIMO technology, a base station (BS) is provided with a large number of antennas. The number of antennas may be one hundred or several hundreds of antennas, which is several orders of magnitude higher than the number of antennas in legacy communication systems.

Precoding (or beamforming) is critically important processing in the massive MIMO downlink system, which utilizes the channel state information (CSI) at a transmitter. With reliable CSI, optimal precoding can maximize the channel performance. In massive MIMO, considerable numbers of antennas at the base station provide large degrees-of-freedom for precoding. Traditional precoding approaches commonly used in the MIMO system cannot make full use of these degrees-of-freedom to meet different requirements in practical systems. For example, for practical applications, each antenna has its own amplifier and for each amplifier there is a limit on instantaneous peak-power of signals. The amplitudes of transmitted signals are expected not to exceed the limit of the amplifier to avoid introducing non-linear distortions into the system. For another example, Multiple-Input Multiple-Output-Orthogonal Frequency Division Multiplexing (MIMO-OFDM) combines MIMO and OFDM, as one of the major disadvantages of OFDM, the time domain signals on the transmitting antennas have large envelope fluctuations. When the signals pass through high power amplifiers (HPAs), the large envelope fluctuations would cause severe nonlinear distortions. Peak-to-average power ratio (PAPR, also called PAR) which is a well-known measure of the envelope fluctuations also is expected to be reduced to avoid introducing non-linear distortions. Since the traditional precoding approaches use a fixed precoding matrix based on a channel matrix, the amplitudes of the transmitted signals cannot satisfy the practical requirements.

In addition, hundreds of antenna elements at the BS may result in excessively high hardware costs and power consumption. Hence, in the practical massive MIMO system, low-cost and power-efficient hardware components should be used at the BS to reduce hardware costs and power consumption. Low-resolution digital-to-analog converters (DACs) have the potential to mitigate the high hardware costs and power consumption problem. In order to use low-resolution DACs at the BS, a quantized precoding may be used instead of the traditional precoding scheme. However, linear-quantized precodings often have very poor performances and the complexity of nonlinear precodings is too high, it is not suitable for the practical massive MIMO system.

SUMMARY

In general, example embodiments of the present disclosure provide a method, transmitter, apparatus and computer readable storage media for signal precoding of massive MIMO.

In a first aspect, a method implemented at a transmitter is provided. In the method, the following operations are iteratively performed: determining a first number of signals to be transmitted by the first number of antennas in a second number of streams based on a second number of original signals, determining whether at least one feature of the first number of signals is to be regulated, and in response to determining that the at least one feature of the first number of signals is to be regulated, adjusting at least one of the first number of signals in order to regulate the at least one feature of the first number of signals. Accordingly, the first number of signals in the second number of streams are transmitted by the first number of antennas.

In a second aspect, a transmitter is provided. The transmitter comprises a first number of antennas, at least one processor and at least one memory including computer program codes. The at least one memory and the computer program codes are configured to, with the at least one processor, cause the transmitter to iteratively perform the following operations: determining a first number of signals to be transmitted by the first number of antennas in a second number of streams based on a second number of original signals, determining whether at least one feature of the first number of signals is to be regulated, and in response to determining that the at least one feature of the first number of signals is to be regulated, adjusting at least one of the first number of signals in order to regulate the at least one feature of the first number of signals. Accordingly, the first number of signals in the second number of streams are transmitted by the first number of antennas.

In a third aspect, there is provided an apparatus comprising means for performing the method according to the first aspect.

In a fourth aspect, there is provided a computer readable storage medium that stores a computer program thereon. The computer program, when executed by a processor of a transmitter, causes the transmitter to perform the method according to the first aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
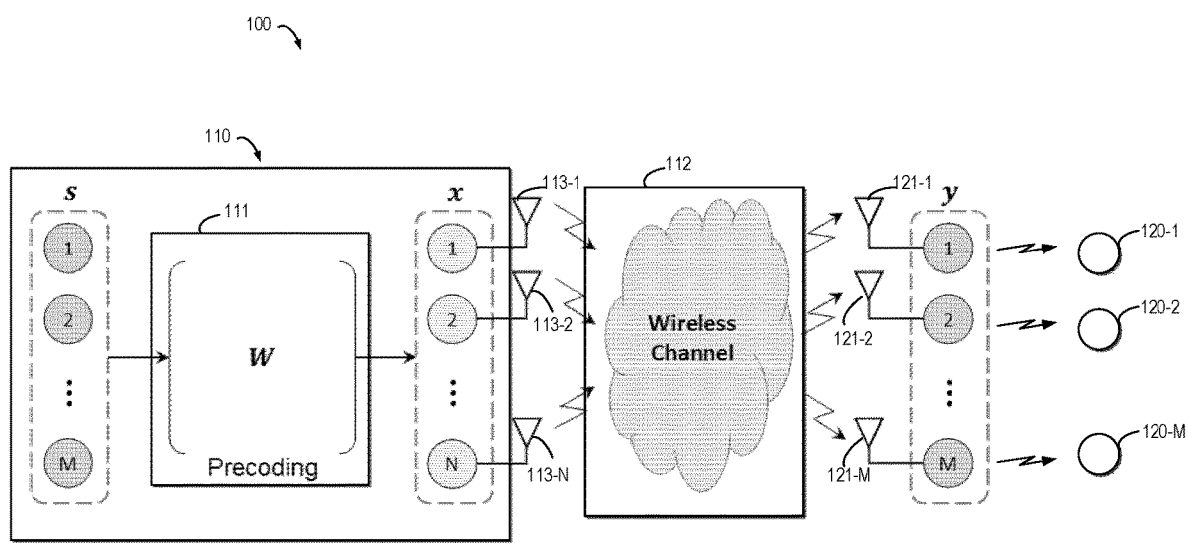
FIG. 1 shows an example communication system in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "transmitter" refers to a device capable of transmitting a signal. As used herein, the term "receiver" refers to a device capable of receiving a signal. In example embodiments of the present disclosure, the transmitter may be provided with a large number of antennas for transmitting signals. The receiver may be provided with one or more antennas for receiving signals. The transmitter or receiver may be implemented by or as a part of any suitable device, including, for example, a network device or a terminal device.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As described above, in massive MIMO, precoding at a transmitter which comprises multiple antennas becomes more important to ensure reliable downlink transmission. In the massive MIMO system, large number of antennas at the BS provides large degrees-of-freedom, which makes it possible to seek an optimal solution of the precoding problem. A gradient descent (GD) based precoding scheme may be used to take advantage of the large degrees-of-freedom to meet different requirements in practical systems and meanwhile cover the traditional linear precoding approaches. In implementing the GD based precoding process, requirements to limit the precoded signals can be introduced as perturbations to redirect the gradient descent steps. As such, traditional precoding schemes can be easily implemented by the GD based precoding scheme while the features of the precoded signals can be regulated to meet different requirements.

An example process of precoding in an example massive MIMO downlink system will be discussed below. In this example, a network device (e.g., gNB) is equipped with N antennas serving M active streams simultaneously for terminal devices (e.g., UEs). y represents the received signals of all M streams, which has a size of M×1, and x represents the transmitted signal, which has a size of N×1. H represents a channel matrix, which has size M×N. Then y may be calculated using the equation (1) as follows:

$$y = Hx + n \quad (1)$$

A column vector s represents the original signals, which has a size of M×1 and should be transmitted in active streams to specific users. It is supposed that $\mathbb{E}[\|s_i\|^2] = 1$ (i=1,2, ..., M) and n is Gaussian white noise with zero mean and variance $\sigma_n^2$.

In the massive MIMO system, precoding is a process of transforming the original signals s to be the transmitted signals x on antennas. The precoding at a transmitter may be described in general using the equation (2) as follows:

$$x = Ws \quad (2)$$

The received signals y may be rewritten by equation (3) as follows:

$$y = HWs + n \quad (3)$$

In order to receive the original signals s correctly, the precoding matrix needs to be designed to make the received signals y being a scaled version of s.

Conventionally, several linear precoding/beamforming schemes may be used for precoding in the massive MIMO system, such as Matched Filter (MF), Zero Forcing (ZF), Regularized Zero Forcing (RZF) and so on.

An example MF scheme will be discussed below.

The matched filter scheme is the simplest precoding approach which only uses the conjugate transpose of the downlink channel matrix as the precoding matrix. Then the precoding matrix $W_{mf}$ may be expressed by equation (4) as follows:

$$W_{mf} = H^H \quad (4)$$

Then the precoded signals can be calculated by $x = W_{mf}s$. The MF scheme is also known as maximum ratio combining/transmission (MRC/MRT) scheme, which maximizes signal gains at the intended users. The columns of the precoding matrix can be normalized to a unit norm by right multiplying a diagonal matrix $D_{mf}^{-1}$, where the diagonal elements of $D_{mf}$ are the row lengths of the channel matrix H. Then the received signal vector $y_{mf}$ can be rewritten by equation (5) as follows:

$$y_{mf} = HH^H D_{mf}^{-1} s + n \quad (5)$$

For an optimal scenario where the channel vectors in H are mutually orthogonal, the received signal vector can be calculated by $y_{mf} = D_{mf}s + n$, which means the length of the channel vectors are exactly the gains of the intended users. Accordingly, the MF precoding is optimal in this scenario.

However, the channel vectors are often correlated, and inter-user interference cannot be ignored. Since the MF precoding does not take the inter-user interference into consideration, the rate per user would be small in this scenario.

An example ZF scheme will be discussed below.

ZF precoding uses the pseudo-inverse of a channel matrix as a precoding matrix to implement block-level precoding. The precoding matrix may be represented as $W_{zf}$, then the ZF precoding can be calculated by equation (6) as follows:

$$W_{zf} = H^H(HH^H)^{-1} \quad (6)$$

The precoded signals can be calculated by $x = W_{zf}s$. The columns of the precoding matrix can be normalized to a unit norm by right multiplying a diagonal matrix $D_{zf}$, where the diagonal matrix $D_{zf}$ may be represented by equation (7) as follows:

$$\text{diag}(D_{zf}) = \sqrt{\frac{1}{\text{diag}(W_{zf}^H W_{zf})}} = \sqrt{\frac{1}{\text{diag}((HH^H)^{-1})}} \quad (7)$$

Then the ZF precoding can be calculated by equation (8) as follows:

$$Y_{zf} = HH^H(HH^H)^{-1}D_{zf}s + n = D_{zf}s + n \quad (8)$$

Accordingly, the ZF precoding eliminates the interference by transmitting the signals toward the intended user while nulling in the directions of other users.

For the optimal scenario where the channel vectors in H are mutually orthogonal, $D_{zf}$ will become $D_{mf}$, and the received signal can be rewritten by $y_{zf} = D_{mf}s + n$. Accordingly, the ZF precoding becomes the MF precoding, and the ZF precoding also transmits the signals with maximum ratio.

However, when a highly correlated channel exists, there is severe multiuser interference (MUI). In order to de-correlate the channel, the ZF precoding uses additional information, thus reducing the channel capacity. In addition, in some scenarios, the inverse of $HH^H$ may not exist, and the ZF precoding cannot be used any more.

An example RZF scheme will be discussed below.

Regularized zero forcing, which is also known as MMSE precoding, Wiener filter precoding and so on, is a popular linear precoding for the MIMO wireless communication system. Due to the ZF precoding has an inherent defect that the inverse of $HH^H$ may not exist, the RZF precoding can eliminate this defect by introducing a regularization factor. Typical RZF precoding may be represented by equation (9) as follows:

$$W_{rzf} = H^H(HH^H + \lambda I) \quad (9)$$

where $\lambda$ is a regularization factor, which may be selected according to the signal to noise ratio (SNR). It is supposed that all streams have the same SNR, represented by $\rho$, the regularization factor $\lambda$ can be selected as a reciprocal of the SNR by equation (10) as follows:

$$\lambda = \frac{1}{\rho} \quad (10)$$

Similarly, the columns of the precoding matrix can also be normalized to a unit norm by right multiplying a diagonal matrix $D_{rzf}$, where the diagonal matrix $D_{rzf}$ may be represented by equation (11) as follows:

$$\text{diag}(D_{rzf}) = \sqrt{\frac{1}{\text{diag}(W_{rzf}^H W_{rzf})}} = \sqrt{\frac{1}{\text{diag}((HH^H + \lambda I)^{-1} HH^H (HH^H + \lambda I)^{-1})}} \quad (11)$$

The RZF precoding is a trade-off between the MF precoding and ZF precoding. When $\lambda \to \infty$, it becomes the MF precoding and when $\lambda \to 0$, it becomes the ZF precoding.

For the non-homogeneous SNR scenario where each stream has its own SNR $\rho_k (1 \le k \le M)$, the regularization factor for each stream may also be different, where the regularization factor can be calculated by equation (12) as follows:

$$\lambda_k = \frac{1}{\rho_k}, \, 1 \le k \le M \quad (12)$$

Denote a diagonal matrix whose diagonal elements are the regularization factors ($\lambda_k$, $1 \le k \le M$) as E, then the precoding matrix of RZF can be calculated by equation (13) as follows:

$$W_{rzf} = H^H (HH^H + \Sigma)^{-1} \quad (13)$$

The computation of the RZF precoding involves the inversion of a matrix with large dimension, especially for a large number of users and antennas. Therefore, the RZF precoding is difficult to achieve in practice.

These above block-level precoding schemes are not flexible, since the precoding matrices are fixed for a specific channel matrix. When the transmitted signals are obtained by left multiplying these precoding matrices, it is not easy to improve the characteristics of the transmitted signals, because modifications on the transmitted signals may lead to information loss.

In addition, a simplified GD based precoding approach proposes an efficient precoding algorithm to massive MIMO-OFDM Peak to Average Power Ratio (PAPR) reduction. This approach implements the basic ZF precoding by the GD algorithm and is combined with a newly proposed look-ahead clipping approach, reducing the PAPR of the massive MIMO-OFDM downlink system into a very low level.

Though the simplified GD based precoding is more flexible than the basic ZF precoding, it does not consider the limitations on the precoded signals. In addition, the simplified GD based precoding only implements the basic ZF precoding by GD algorithms, and does not cover other traditional precoding.

Moreover, linear-quantized precoding approaches are proposed to implement quantized precoding in low-resolution DACs at the BS, such as maximum ratio transmission-quantized (MRTQ), ZF-quantized (ZFQ) and RZF-quantized (RZFQ). These approaches quantize the amplitude of the precoded signals which have been precoded using traditional precoding schemes, reducing hardware costs and power consumption at the BS.

An example linear-quantized precoding scheme will be discussed below.

The linear-quantized precoding is the easiest way to implement quantized precoding. The linear precoding matrix may be represented as W, then the precoded signals x can be calculated by equation (14) as follows:

$$x = Q(Ws) \quad (14)$$

where $Q(\bullet)$ is the quantizer-mapping function, which is a nonlinear function that describes quantizing operation of the DACs at the BS. W may be any one of the above described $W_{mf}$, $W_{zf}$, and $W_{rzf}$, thereby implementing corresponding MRTQ, ZFQ, and RZFQ.

For 1-bit precoding which is a specific case of a quantized precoding, the quantizer-mapping function can be represented by equation (15) as follows:

$$Q(x) = \sqrt{\frac{P}{2N}} \left( \text{sgn}(\Re\{x\}) + j\,\text{sgn}(\Im\{x\}) \right) \quad (15)$$

where P and N denote the predefined total power of x and the number of antennas at the BS respectively. $\Re\{\bullet\}$ and $\Im\{\bullet\}$ denote the real and imaginary parts of a complex vector respectively. $\text{sgn}(\bullet)$ is used to denote the signum function, which is applied element-wise to vectors and defined by equation (16) as follows:

$$\text{sgn}(x) = \begin{cases} 1, & x \ge 0 \\ -1, & x < 0 \end{cases} \quad (16)$$

Though linear-quantized precodings are quite simple, they often have very poor performances. Therefore, many nonlinear precoders are proposed to improve the performance. Among these precoders, squared-infinity norm Douglas-Rachford splitting (SQUID) is proposed, which is a near-optimal precoding with relatively low complexity. However, its complexity is still too high, and it is not suitable for practical massive MIMO systems.

Example Embodiments of the present disclosure provide a precoding scheme in massive MIMO. If a number of original signals are to be sent to one or more receivers, a transmitter performs the precoding scheme to determine a number of signals to be transmitted by a number of antennas in a number of streams to regulate at least one feature of the number signals to be transmitted. Accordingly, a number of received signals corresponding to the number of transmitted signals will be received in the number of streams. With this process, the transmitter iteratively performs the following operations: determining a first number of signals to be transmitted by the first number of antennas in a second number of streams based on a second number of original signals, determining whether at least one feature of the first number of signals is to be regulated, in response to determining that the at least one feature of the first number of signals is to be regulated, adjusting at least one of the first number of signals in order to regulate the at least one feature of the first number of signals. For example, if the feature of the first number of signals is power of the number of signals to be transmitted, the power of the signal of the number of signals may be adjusted to be within a power range. For another example, if the feature of the number of signals to be transmitted is peak to average power ratio of the number of signals, the power of the signal of the number of signals may be adjusted to be equal to or less than an upper power limit. For another example, if the feature of the first number of signals is amplitudes of the number of signals to be transmitted, the at least one of the number of signals are adjusted by adjusting an amplitude of the at least one of the number of signals into or around a quantized level. The precoding scheme of the present disclosure takes advantage of the large degrees-of-freedom of the massive MIMO system to ensure at least one feature of the number of signals to be transmitted can be regulated, such as the amplitudes of the transmitted signals can be within the linear working area of amplifiers, PAPR of MIMO-OFDM can be reduced, and the amplitude of signals can be quantified and so on.

FIG. 1 shows an example environment 100 in which embodiments of the present disclosure can be implemented. The environment 100, which may be a part of a massive MIMO downlink system, includes a transmitter 110 and receivers 120-1, . . . , 120-M (hereinafter collectively referred to as a receiver 120). The transmitter 110 comprises transmitting antennas 113-1, . . . , 113-N serving M active streams simultaneously, the receivers 120-1, . . . , 120-M each are provided with one receiving antenna 121-1, . . . , or 121-M. N and M may be any suitable positive integer, and N may be more than M. It is to be understood that the receiver 120 may be provided with more than one receiving antennas. Accordingly, M streams may correspond to another number of receivers, where each receiver can have one or more streams.

It is to be understood that the numbers of transmitters and receivers are shown only for the purpose of illustration without suggesting any limitation. The environment 100 may include any suitable number of transmitters and receivers adapted for implementing embodiments of the present disclosure.

The transmitter 110 and the receiver 120 can be implemented by or as a part of any suitable device. In some embodiments, the transmitter 110 may be implemented at a network device, and the receiver 120 may be implemented at terminal devices. In the embodiments where the environment 100 is a part of a relay communication network. In this example, the transmitter 110 may be implemented at a network device, and the receiver 120 may be at a relay, and vice versa. In some other embodiments, the transmitter 110 and the receiver 120 may be both implemented at terminal devices in device-to-device (D2D) communications, which may be alternatively referred to as sidelink, or vehicle to everything (V2X).

As shown, the transmitter 110 and the receivers 120-1, . . . , 120-M may communicate with via a wireless channel 112. The communication between the transmitter 110 and the receiver 120 may follow any suitable communication standards or protocols such as Universal Mobile Telecommunications System (UMTS), long term evolution (LTE), LTE-Advanced (LTE-A), the fifth generation (5G) NR, Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC) and ultra-reliable low latency communication (uRLLC) technologies. In some embodiments, the MIMO technology, such as single-user MIMO (SU-MIMO) and multi-user MIMO (MU-MIMO) technologies, may be used for the communications in the environment 100.

The transmitter 110 can perform precoding based on the original signals. In the massive MIMO system, precoding at the transmitter 110 is one of the most important process to ensure that the receiver 120 is able to receive the signals correctly. When the transmitter 110 is implemented at a network device, the precoding is the precoding for the downlink, and when the transmitter 110 is implemented at terminal devices, the precoding is the precoding for the uplink. As shown in FIG. 1, precoding is a process of transforming the original signals s to be the transmitted signals x on antennas. As discussed above, the precoding at a transmitter may be described in general using the equation (2) and equation (3): x=Ws and y=HWs+n. In order to receive the original signals s correctly, the precoding matrix needs to be designed to make the received signals y being a scaled version of s.

In some embodiments, GD based precoding is utilized. The GD based precoding at the transmitter 110 may be converted to solve the equation (17) as follows:

$$Gs = Hx \quad (17)$$

where G is a preprocessing matrix which decides the gains of the signals received at the receiver 120.

The preprocessing may be performed using any suitable approach. As an example, the transmitter 110 may preprocess the original signals to increase the gain of the original signals by a constant. As another example, the transmitter 110 may preprocess the original signals based on a signal to noise ratio associated with streams. As yet another example, the transmitter 110 may preprocess the original signals based on channel state information (CSI). The scope of the present disclosure will not be limited in this regard. Accordingly, the receiver 120 may have enough gains to recover the original signals from the received signals.

In some other example embodiments, the preprocessing matrix may not be used. Then, the GD based precoding at the transmitter 110 may be described using the equation (18) as follows:

$$s = Hx \quad (18)$$

Figure 2:
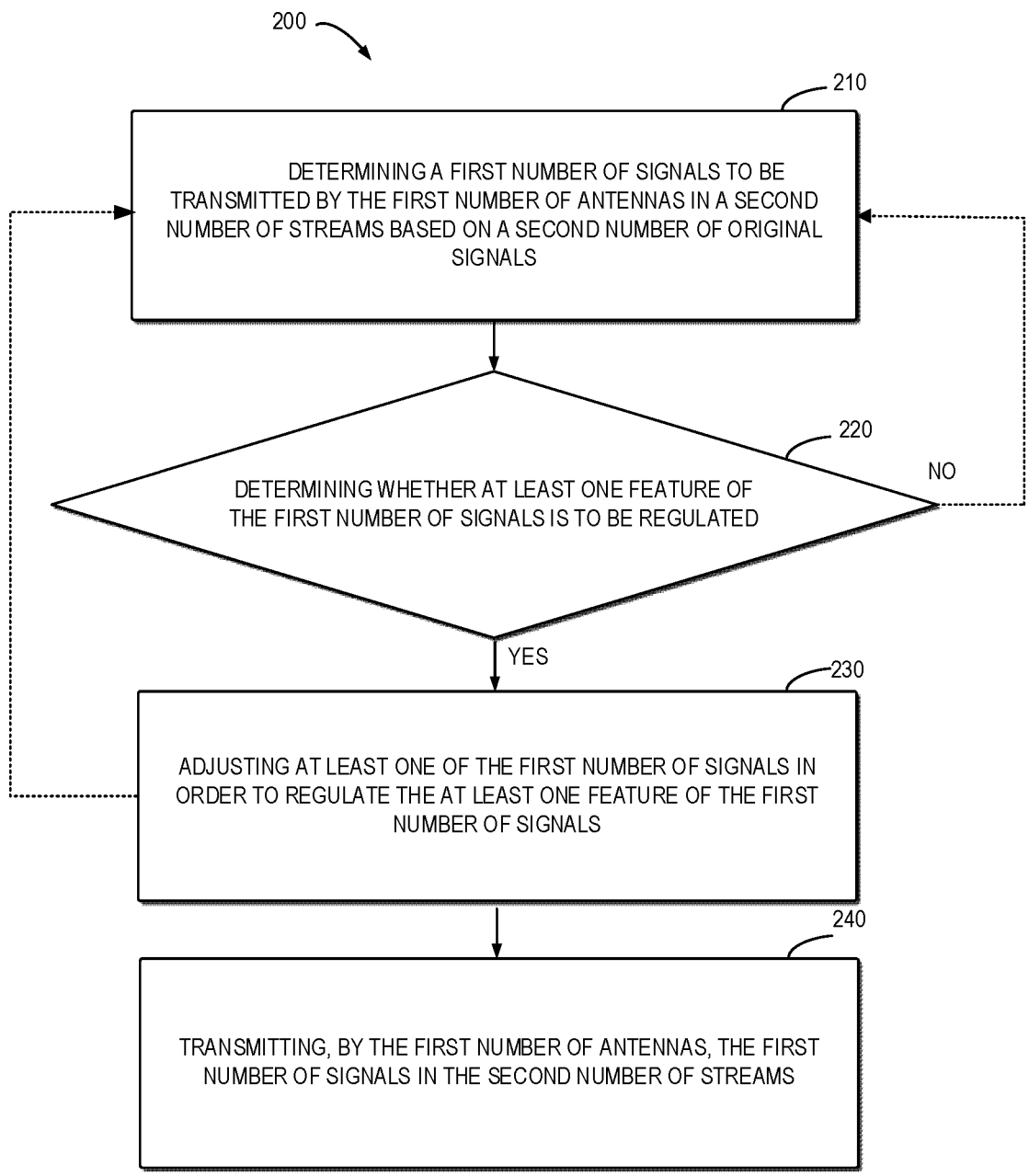
FIG. 2 shows a flowchart of an example method 200 for precoding of massive MIMO according to some example embodiments of the present disclosure.

FIG. 2 shows a flowchart of an example method 200 in accordance with some embodiments of the present disclosure. The method 200 can be implemented at the transmitter 110 as shown in FIG. 1. For the purpose of discussion, the method 200 will be described with reference to FIG. 1.

At block 210, the transmitter 110 determines a number (referred to as a first number) of signals (for example, x) to be transmitted by a first number of antennas (for example, the transmitting antennas 113-1, . . . , 113-N) of the transmitter in a number (referred to as a second number) of streams based on a second number of original signals (for example, s). The first and second numbers may be any suitable number. In the example as shown in FIG. 1, the first and second numbers are N and M, respectively.

The first number of signals to be transmitted may be determined based on any suitable algorithm. In some example embodiments, the first number of signals may be determined to minimize a difference between the second number of original signals and the second number of received signals to be received in the second number of streams. In some example embodiments, the transmitter 110 may determine the second number of received signals based on channel state information (CSI) and the first number of signals to be transmitted. The transmitter 110 may be aware of CSI by an explicit or implicit indication transmitted by the receiver 120.

For example, in the example embodiments where the GD based precoding is utilized, in order to find the optimal solution of equation (18), a cost function may consider a difference between s and H and the transmitted signals x in equation (18). When find the transmitted signals x, the difference between s and Hx is to be minimized.

In some example embodiments, the cost function may be convex. The convex cost function may have a minimum solution and may guarantee the fast convergence of the GD algorithm. Once the cost function has been designed, the gradient of the cost function is also determined, and then the GD algorithm can be used to minimize the cost function. When the cost function is minimized, the optimal solution would be obtained.

The cost function may also consider the power of the transmitted signals x to reduce the power. For example, in some embodiments, a Mean square error (MSE) cost function may be used, which relates to a squared L2-norm of a difference between two vectors. The cost function may be represented by equation (19) as follows:

$$J = \|s - Hx\|_2^2 + \lambda \|x\|_2^2 = (s - Hx)^H(s - Hx) + \lambda x^H x \tag{19}$$

where $\lambda$ is a regularization factor, and it can be set to 0 when no regularization is performed.

$$\|x\|_2^2$$

is the squared L2-norm of the transmitted signal vector x, which represents the power of the transmitted signals.

$$\|s - Hx\|_2^2$$

represents the difference between the original signals s and the ideal received signals Hx.

The regularization factor A may be determined based on any suitable rules. In some example embodiments, $\lambda$ may be selected according to the SNR associated with the second number of streams. In this case, the first number of signals may be further adjusted based on the SNR associated with the second number of streams to regulate at least one feature of the first number of signals. SNR may suppress the influence of noise to some extent and further improve the accuracy of the adjusted first number of signals.

SNR is a parameter for evaluating the communication conditions of a channel. A channel with a high SNR may have a larger channel capacity. The SNR of all active streams may be the same (e.g., $\rho$), or the SNRs for all streams may be different (e.g., $\rho_k(1 \leq k \leq M)$). In addition, SNR can be measured by the receiver 120, and the transmitter 110 may be aware of SNR by an explicit or implicit indication transmitted by the receiver 120.

In some example embodiments, in order to rapidly reduce the difference between the the second number of original signals (for example, s) and the second number of received signals (for example, Hx), a direction in which a descending rate of the determined difference is above a threshold rate is determined. Accordingly, the first number of signals are updated to enable the determined difference to descent in the determined direction. For example, the determined direction is the direction along which the difference descended the fastest, i.e., the descending rate of the determined difference is above a threshold rate. The direction may be determined using any suitable approach. For example, the direction can be determined based on the determined difference and CSI, or the direction can be determined further based on a signal to noise ratio (SNR) associated with the second number of streams. The scope of the present disclosure will not be limited in this regard.

For example, in the example embodiments where the GD based precoding is utilized, when the cost function has been designed, the gradient of the cost function can be determined. The gradient indicates that a function changes fastest along this direction (the direction of this gradient) at this point, with the highest rate of change. For example, for the cost function as in equation (19), the gradient of the cost function (i.e., equation (19)) can be calculated by equation (20) as follows:

$$\frac{\partial J}{\partial x} = \frac{\partial (s^H s - s^H Hx - x^H H^H s + x^H H^H Hx + \lambda x^H x)}{\partial x} = \tag{20}$$
$$0 - H^H s - H^H s + 2H^H Hx + 2\lambda x = 2(H^H H + \lambda I)x - 2H^H s$$

For the GD algorithm, the goal is to minimize the gradient to zero. Therefore, the gradient of the cost function can be set to zero to infer the final solution of the GD algorithm. Then the final solution of the GD algorithm can be calculated by equation (21) as follows:

$$x = (H^H H + \lambda I)^{-1} H^H s = H^H (HH^H + \lambda I)^{-1} s \tag{21}$$

It is obvious that the solution is similar to the solution of RZF approach. In addition, when $\lambda=0$, i.e. without regularization, the solution of the GD based precoding can be rewritten by equation (22) as below:

$$x = (H^H H)^{-1} H^H s = H^H (HH^H)^{-1} s \tag{22}$$

It is the solution of the ZF approach, which means, setting $\lambda$ to 0 will lead the GD based precoding to become the solution of ZF approach. Thus, the GD based precoding scheme could conveniently implement both the ZF and RZF precoding schemes.

Generally, the signals s in equation (18) may not be limited to the original signals, it can be a processing result of the original signals. This process can be further expressed as matrix multiplication, i.e. Gs, where G is the preprocessing matrix. That is to say, the equation (18) may be rewritten as equation (17): Gs=Hx.

Preprocessing matrix G controls the gains of the signals for all streams. When G is a simple diagonal matrix, the diagonal elements are exactly the gains of different streams for a non-regularized GD based precoding.

As described above, by means of equation (17), equation (20) may be rewritten by equation (23):

$$x = (H^H H + \lambda I)^{-1} H^H Gs = H^H (HH^H + \lambda I)^{-1} Gs \tag{23}$$

SGD algorism is one of the practical implementations of GD approaches, it has faster convergence and lower complexity for the massive MIMO precoding scenario. An example process of SGD based precoding will be discussed below.

For simplification, denote Gs as $\bar{s}$ in the following part. Then the gradient of the cost function in equation (19) can be written by equation (24) as below:

$$\frac{\partial J}{\partial x} = 2[H^H(Hx-\bar{s})+\lambda x] \quad (24)$$

The difference, i.e. the error vector Hx−s̄ may be represented as δ, then equation (24) can be written by equation (25) as below:

$$\frac{\partial J}{\partial x} = 2(H^H \delta + \lambda x) \quad (25)$$

To minimize this gradient, split equation (25) by δ, then equation (25) can be written by equation (26) as follows:

$$\frac{\partial J}{\partial x} = 2(\Sigma_k \delta_k H_k^H + \lambda x) \quad (26)$$

where $H_k$ denotes the kth row of H.

Since 1≤k≤M, equation (26) can be further written by equation (27) as follows:

$$\frac{\partial J}{\partial x} = 2\Sigma_k \left(\delta_k H_k^H + \frac{\lambda}{M} x\right) \quad (27)$$

In some example embodiments, the transmitter 110 may iteratively adjust the transmitted signals based on the respective original signals. The transmitted signals may be adjusted based on the respective original signals of the number of original signals one by one. In some example embodiments, in the initial phase, the first number of signals to be transmitted may be set to a preset value, for example, 0.

In some example embodiments, for the kth adjustment of the first number of signals, the transmitter 110 determines a difference between a kth received signal of the second number of received signals and a kth original signal of the second number of original signals. k is an integer greater than 0 and the kth received signal of the second number of received signals is to be received in a kth stream of the second number of streams. Based on the determined difference, the transmitter 110 updates the first number of signals to reduce the power of the first number of signals. In some example embodiments, the number of iterations of updating the first number of signals is equal to the number of the second number of streams. The transmitter 110 updates the first number of signals iteratively until all the streams have been updated. That is to say, the kth updated first number of signals may be used as the first number of signals to determine the k+1th updated first number of signals at block 210.

An example iterative adjustment of the first number of signals will be discussed below by taking a SGD based precoding process as an example. If $$\delta_k H_k^H + \frac{\lambda}{M} x$$

is represented as $g_k$, the goal of SGD algorism is to minimize all $g_k$ one by one. For kth iteration of any epoch, the SGD algorism updates x to minimize $g_k$. After M iterations (i.e. one epoch), all $g_k$ (1≤k≤M) would be reduced. For kth iteration of any epoch, the SGD algorism updates x to minimize $g_k$. After several epochs, all $g_k$ (1≤k≤M) would be minimized and the total gradient would also be minimized.

In some example embodiments, the first number of signals may be updated to descent in the determined direction based on an update step size. For each updating the first number of signals, the first number of signals may be updated based on the update step size.

In some example embodiments, the update step size may be determined based on channel state information and a SNR associated with the second number of streams. Accordingly, the transmitter 110 may update the first number of signals to enable the determined difference to descent based on the update step size in the determined direction. By using SNR may suppress the influence of noise to some extent, and updating the first number of signals based on the update step size can enable the determined difference to descent to be a minimum value in the determined direction. Thereby the performance of the precoding is further improved. Of course, in some example embodiments, the update step size may be determined based only on CSI to reduce the complexity of the algorithm.

For example, during any iteration of one epoch of the SGD algorism, the update step size is critically important. A poor step size would make the SGD algorism converge slowly or even diverge. For the kth iteration of any epoch, it is reasonable to minimize $g_k$ to zero. Thus, after updating of the kth iteration, the kth gradient g′$_k$ can be recalculated, and it is expected to be zero, as in following equation (28):

$$g'_k = \delta'_k H_k^H + \frac{\lambda}{M} x' = H_k^H (H_k x' - \bar{s}_k) + \frac{\lambda}{M} x' = 0 \quad (28)$$

where x′=x+α$_k$g$_k$ is the updated solution. Denote α$_k$ as the update step size for the kth iteration of any epoch, and then equation (28) can be written by equation (29) and (30) as below:

$$g'_k = H_k^H [H_k(x + \alpha_k g_k) - \bar{s}_k] + \frac{\lambda}{M}(x + \alpha_k g_k) = 0 \quad (29)$$

$$g'_k = H_k^H [(H_k x - \bar{s}_k) + \alpha_k H_k g_k] + \frac{\lambda}{M}(x + \alpha_k g_k) = 0 \quad (30)$$

Since $\delta_k = H_k - \bar{s}_k$ is a scalar, then equation (30) can be written by equation (31) as below:

$$g'_k = \delta_k H_k^H + \frac{\lambda}{M} x + \alpha_k \left(\|H_k\|_2^2 + \frac{\lambda}{M}\right) g_k = 0 \quad (31)$$

where $$g_k = \delta_k H_k^H + \frac{\lambda}{M} x,$$

then equation (31) can be written by equation (32) as follows:

$$g'_k = \left[1 + \alpha_k \left(\|H_k\|_2^2 + \frac{\lambda}{M}\right)\right] g_k = 0 \quad (32)$$

Generally, $g_k$ may not be zero, then equation (32) can be simplified into equation (33) as follows:

$$1 + \alpha_k \left( \|H_k\|_2^2 + \frac{\lambda}{M} \right) = 0 \tag{33}$$

The update step size for the kth iteration of any epoch $\alpha_k$ can be calculated by equation (34) as follows:

$$\alpha_k = -\frac{1}{\|H_k\|_2^2 + \lambda/M} \tag{34}$$

Scaling the gradient $g_k$ by this $a_k$ can help the SGD algorithm minimize the difference between $H_k x$ and $\bar{s}_k$ in one step. In one epoch, the SGD algorism would minimize all $g_k$ one by one. After a few epochs, all gradients would be minimized, and the total gradient would also be minimized.

It is to be noted that the regularization factor $\lambda$ can be selected as a reciprocal of the SNR p and it can be set to 0 when no regularization is performed. But when the SNR is too low, the reciprocal of the SNR would be too large. Since a large regularization factor may have poor effect on the convergence, it is not recommended to use $1/\rho$ as the regularization factor when the SNR is very low. For example, when the SNR is not less than −10 dB, $1/\rho$ would not be more than 10, which is a suitable regularization factor; when the SNR is less than −10 dB, an empirical value for $\lambda$, such as $$\min\left( \frac{1}{\rho}, 20 \right)$$

can be selected.

Though it is supposed that the SNR of all active streams are the same, it is impossible in practical systems. Non-homogeneous SNR condition, which means each stream has its own SNR, is more practical. Denote the SNRs for all streams are $\rho_k(1 \le k \le M)$, the unique $\lambda$ in equation (34) can be replaced with $\lambda_k(1 \le k \le M)$.

Figure 3:
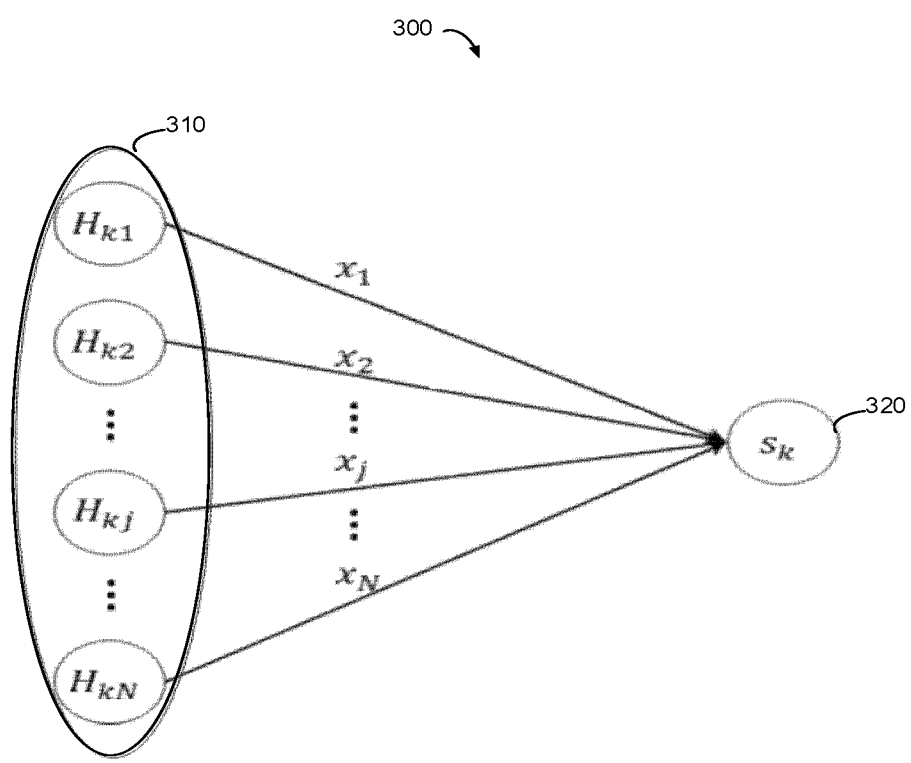
FIG. 3 shows an example for precoding of massive MIMO according to some example embodiments of the present disclosure.

The process of adjusting the signals to be transmitted by antennas of the transmitter based on GD algorithm can be considered as a training process of a two-layer linear ANN. When training this ANN, rows of the channel matrix H can be treated as samples, and elements of the signals s can be treated as labels. All M pairs of $(H_k, s_k)$ are then used to train the parameters of the ANN, i.e. the transmitted signal vector x, which is the result of the GD based precoding. FIG. 3 shows an example of ANN for GD based precoding 300 of the present disclosure.

As shown in FIG. 3, the ANN for GD based precoding 300 may comprise an input layer 310 and an output layer 320. Each element of the kth row of H may be used as input and elements of s may be used as output. $s_k$ are represented as the kth element of s and $H_{k,j}$ are represented as the element of kth row, jth column of H, for each pair of $(H_k, s_k)$, the weight vector x would be updated. The weight vector x may be understood as the parameters of the ANN for GD based precoding 300, which are signals for transmitting via transmitting antennas of the gNB 110 on the downlink channel to the UE 120. x (with a size of 1×N) as the candidate of x.

The SGD based precoding algorithm may be described as follows, for example:

Input:
    Signal vector s.
    Channel matrix H.
    SNR $\rho_k$ (1 ≤ k ≤ M), all $\rho_k$ can be totally different or equal to the same $\rho$.
    Preprocessing matrix G (set as βI, where β is the empirical precoding factor to normalize the signal power).
Output:
    Precoded signal x.
Initialization:
    Set maximum iteration times n, 15 is OK.
    Set the regularization factor $\lambda_k$(1 ≤ k ≤ M) as aforementioned or just set it to 0 for non-regularized version.
    Set the learning rate η for SGD empirically, for example η = 1.0.
Main routine:
    Calculate the scaled signal vector:
$$s = Gs \tag{35}$$
    For t = 1 to n:
        For k = 1 to M:
            Calculate the error value:
$$\delta_k = H_k x - s_k \tag{36}$$
            Calculate the gradient vector:
$$g_k = \delta_k H_k^H + \frac{\lambda_k}{M} x \tag{37}$$
            Scale the gradient vector:
$$g_k = -\frac{1}{\|H_k\|_2^2 + \lambda_k/M} g_k \tag{38}$$
            Update the estimated signal vector:
$$x = x + \eta g_k \tag{39}$$
Output: the precoded signal x.
End of SGD based precoding algorithm For each epoch of the SGD based precoding, the computational complexity is O(NM), which is a relatively low complexity compared with the ZF and RZF/MMSE precoding. For the ZF and RZF/MMSE precoding, the matrix inversion operation has a high computational complexity of $O(M^3)$. Along with the rapid growth of the amounts of concurrent users, the cubically increasing complexity of the ZF and RZF/MMSE precoding becomes a great challenge. Hence, the GD based precoding scheme would be more attractive due to its linear increasing complexity.

In addition, the GD based precoding scheme takes advantage of the large degrees-of-freedom to meet different requirements in practical systems while ensuring the antenna working in its linear area. Based on the adjusted signals to be transmitted by a number of antennas of a transmitter, the accuracy of receiving signals at the receiver may be improved.

At block 220, the transmitter 110 determines whether at least one feature of the first number of signals is to be regulated. In an actual system, different application scenarios expect signals to have different features. For example, in massive MIMO, the instantaneous powers of the transmitted signals are expected to be within the linear working area of the amplifier to avoid the non-linear distortion caused by power amplification, or the amplitude of the transmitted signals are quantized to predetermined values to use low-resolution DACs at the BS; and in MIMO-OFDM, PAPR of the transmitted signals is expected to be reduced to avoid introducing non-linear distortions. Therefore, at least one feature of the first number of signals needs to be regulated.

In some embodiments, whether at least one feature of the first number of signals is to be regulated may be determined based on a current iteration number of the performing of the actions. For example, a maximum iteration number for determining the signals to be transmitted and a maximum regulating number for regulating the at least one feature of the first number of signals may be pre-set. In some embodiments, the maximum regulating number may be no greater than the maximum iteration number. For example, if it is determined that the current iteration number is less than the maximum regulating number, the at least one feature of the first number of signals is determined to be regulated.

It is to be understood that the maximum iteration number for determining the signals to be transmitted and the maximum regulating number for regulating at least one feature of the first number of signals may be determined according to actual needs.

If it is determined that no regulation is needed, the method 200 returns to block 210 where the first number of signals are determined iteratively. If the at least one feature of the first number of signals is determined to be regulated, the transmitter 110 adjusts at least one of the first number of signals in order to regulate the at least one feature of the first number of signals at block 230. For example, power of each of the first number of signals may be limited to the maximum value (or a larger value) and the minimum value (or a smaller value), or the amplitude of the at least one of the first number of signals may be adjusted into or around a quantized level.

As described above, the instantaneous powers of the transmitted signals are important features of the signals to be transmitted. They are expected to be within the linear working area of the amplifier to avoid the non-linear distortion caused by power amplification.

In some embodiments, the at least one feature of the first number of signals may comprise power of the first number of signals, and the transmitter 110 may adjust the at least one of the first number of signals by determining whether power of each of the first number of signals is out of a power range. If the transmitter 110 determines that power of a signal of the first number of signals is out of the power range, adjusts the power of the signal of the first number of signals to be within the power range. In some example embodiment, for each of the first number of signals, if the power of the signal of the first number of signals is greater than the maximum or is smaller than the minimum value, it is determined that the first number of signals is out of the power range. If so, the power of the signal of the first number of signals may be adjusted within the power range.

In some example embodiment, the power range may comprise an upper power limit. The transmitter 110 may determine an average power of the first number of signals. Based on the average power, the upper power limit may be determined. If the transmitter 110 determines that the power of the signal of the first number of signals being more than the upper power limit, reduces the power of the signal of the first number of signals to be equal to or less than the upper power limit based on a reduction factor. In some example embodiment, the average power may be determined based on the first number of signals and the first number. In some example embodiment, for each of the first number of signals, if the power of the signal of the first number of signals is above than the upper power limit, the power of the signal of the first number of signals may be reduced to be equal to or less than the upper power limit.

In some example embodiment, the power of the signal may be reduced to be less than the upper power limit. For example, the transmitter 110 may determine the reduction factor based on a current iteration number of the performing of the actions. For each iteration, the reduction factor may be determined based on the current iteration, therefore, the power of the first number of signals may be reduced differently. According to the above, the transmitted signals can be received correctly by the user while ensuring that the instantaneous powers of the transmitted signals are within the linear working area of the amplifier.

In addition, in MIMO-OFDM, PAPR of the transmitted signals is expected to be reduced to avoid introducing non-linear distortions. For example, in the example embodiments where the first number of signals may be orthogonal frequency division multiplexing signals, and the at least one feature of the first number of signals may comprise peak to average power ratio of the first number of signals, the transmitter 110 may adjust the at least one of the first number of signals by determining average power of the first number of signals. Based on the average power, the transmitter 110 may determine an upper power limit. If the transmitter 110 determines that power of each of the first number of signals is more than the upper power limit, reduces the power of the signal of the first number of signals to be equal to or less than the upper power limit. Therefore, the transmitted signals can be received correctly by the user while ensuring that PAPR of the transmitted signals can be reduced to be below a PAPR threshold.

It is to be understood that some features of signals can be combined to meet different practical requirements. For example, it may be desirable to simultaneously reduce the instantaneous powers of the transmitted signals and the PAPR of the transmitted signals. Therefore, it will be appreciated that some of the plurality of features of the signals can be considered in combination to perform the precoding process according to example embodiments of the present disclosure.

In addition, it is also to be understood that reducing the power of a signal to be equal to or less than the upper power limit may be performed using any suitable approach. As an example, clipping and its variations may be used to limit a power of a signal. As another example, some activation functions may also be used to limit a power of a signal. The scope of the present disclosure will not be limited in this regard.

Moreover, in massive MIMO, hundreds of antenna elements at the BS may result in excessively high hardware costs and power consumption. Hence, amplitudes of the transmitted signals are expected to be quantized to predetermined values to use low-resolution DACs at the BS.

In the example embodiments where the at least one feature of the first number of signals may comprise amplitudes of the first number of signals, the transmitter 110 may adjust the at least one of the first number of signals by adjusting an amplitude of the at least one of the first number of signals based on a quantized level. In some embodiments, the transmitter 110 may determine a quantized level. The quantized level may be determined based on the transmit power of antennas, and the number of transmitting antennas. Accordingly, the transmitter 110 may adjust an amplitude of the at least one of the first number of signals into or around the quantized level. For example, it is supposed that the signal of the first number of signals is a complex signal with a real part and an imaginary part. For each of the first number of signals, if the transmitter 110 determines that the amplitude of the real part or of the imaginary part is more than the quantized level, reduces the amplitude of the real part or the imaginary part to be equal to the quantized level. In some embodiments, the transmitter 110 may iteratively adjusting the amplitude of the at least one of the first number of signals to change each signal of the first number of signals to or around the nearest quantized level. In order to change each signal of the first number of signals to or around the nearest quantized level, in some embodiments, the first number of signals may be amplified based on a scale factor before adjusting an amplitude of the at least one of the first number of signals. After finishing maximum iteration number of the iterations, an amplitude of the at least one of the number of signals is adjusted into a quantized level. Accordingly, the transmitter 110 may quantize the adjusted amplitude of the first number of signals.

In order to further improve the accuracy of the precoding, the determination of the first number of signals at block 210, the determination of whether at least one feature of the first number of signals is to be regulated at block 220 and the adjusting at least one of the first number of signals at block 230 are performed iteratively, until an end condition is reached. One iteration of blocks 210, 220 and 230 may also referred to as one epoch in the context of the present disclosure. The end condition may be determined using any suitable approach. For example, the end condition can be a pre-set maximum iteration number, or can be other end conditions, such as a difference between the second number of original signals and a second number of received signals corresponding to the first number of signals being below a difference threshold, or power of each of the first number of signals being less than an upper power limit. The scope of the present disclosure will not be limited in this regard. In some embodiments, until the end condition is reached, a difference between the second number of original signals and a second number of received signals corresponding to the first number of signals is below a predetermined difference threshold, wherein the first number of signals in the second number of streams are to be transmitted via the first number of antennas. For the first time in the iterative operations, the first number of signals may be used a pre-set value.

In the GD based precoding process, the regulation of the first number of signals (for example, x) may introduce the finite perturbations. For example, requirements to limit the features of the precoded signals (such as the instantaneous powers, PAPR, or the amplitudes) can be introduced as perturbations to redirect the gradient descent steps. Therefore, the final solution could be tuned to meet the requirements with little information loss.

It is to be understood that the "finite" has two meanings. Firstly, each perturbation is finite because a large perturbation may make the GD algorithm diverge.

Secondly, the total number of the perturbations is finite and is limited by the total epochs of the GD algorithm.

Figure 4:
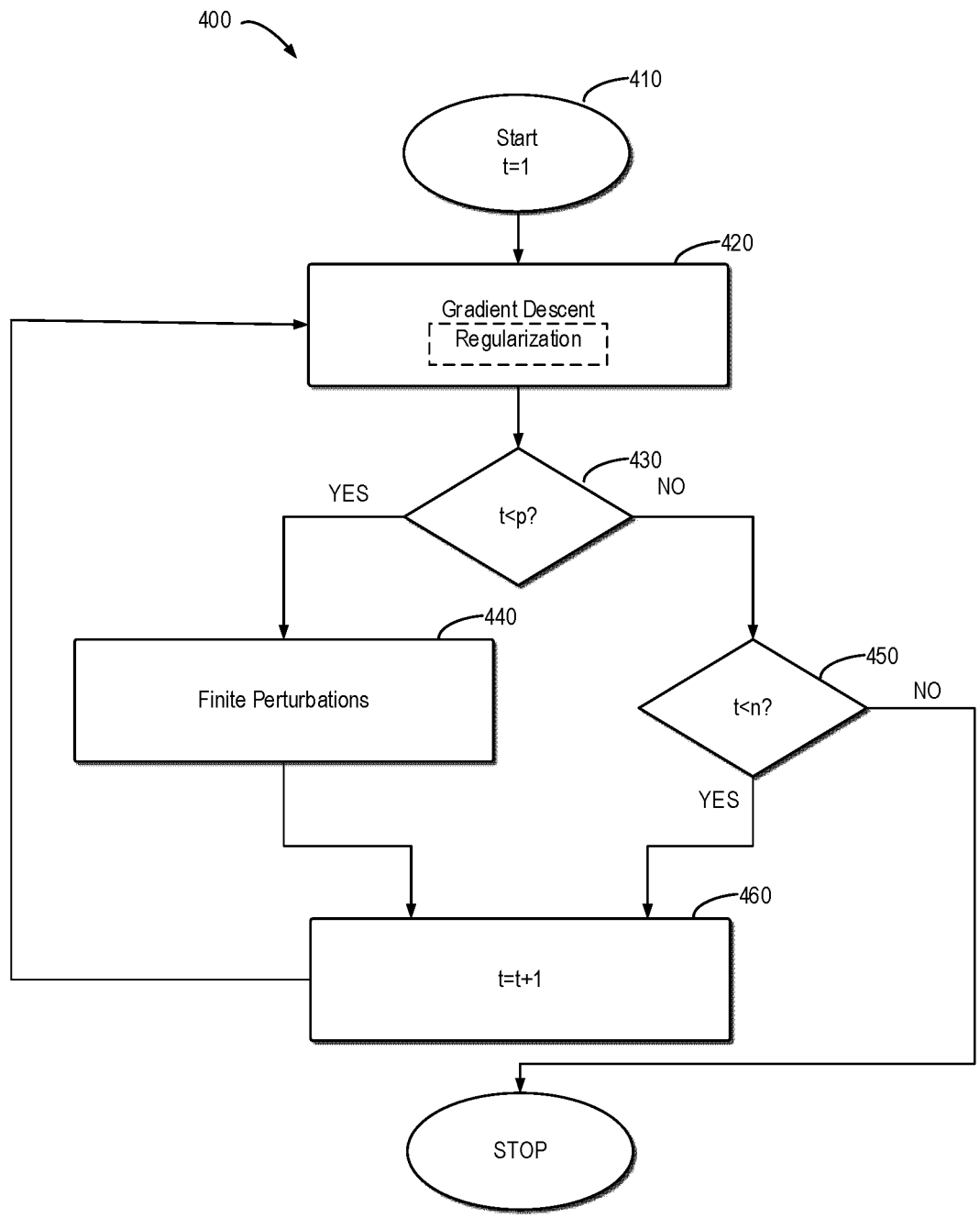
FIG. 4 shows an example for precoding of massive MIMO according to some example embodiments of the present disclosure.

For example, the GD based precoding with finite perturbations may be represented as follows. FIG. 4 shows an example for GD based precoding with finite perturbations according to some example embodiments of the present disclosure.

For the purpose of discussion, a maximum perturbations number (i.e. the total number of the perturbations) p may be set for the finite perturbations procedure, and a maximum iteration number (i.e. the total epochs of the GD algorithm, each epoch comprising M iterations for updating the signals to be transmitted) n may be set to perform the GD algorithm. For example, the maximum perturbations number may be set to p≤n, such as p=n−1.

At block 410, the GD based precoding with finite perturbations starts, wherein the current number of iterations (i.e., a current number of performing GD algorithm) t=1.

At block 420, perform the GD precoding as described above. In particular, for the kth iteration of any epoch, the SGD algorism updates x to minimize $g_k$, after M iterations (i.e. one epoch), all $g_k$ (1≤k≤M) will be descended. In addition, the GD precoding can be performed with regularization or without regularization.

After M iterations (i.e., one epoch), at block 430, determine whether the current number of iterations is less than the maximum perturbations number.

If the current number of iterations is less than the maximum perturbations number, perfoiiii finite perturbations at block 440 and t=t+1 at block 460.

If the current iteration number is not less than the maximum perturbations number, further determine whether the current number of iterations is less than the maximum iteration number at block 450.

If the current number of iterations is less than the maximum iteration number, perform t=t+1 at block 460.

If the current iteration number is not less than the maximum iteration number, the process stops.

It is noted to be that in some embodiments, block 430 can be omitted, and then block 440, 450, and 460 are performed directly after block 420.

After block 460, the above operations are iteratively performed from block 420 until the current number of iterations exceeds the maximum iteration number.

During the epochs of the GD based precoding, finite perturbations are introduced to change the temporary solution, and then the temporary solution is sent back to the GD process. The perturbations added in the temporary solution would redirect the gradient direction, and finite perturbations designed according to practical requirements would finally lead the GD process to a better solution, which just meets the practical requirements.

For example, in practical applications, instantaneous per-antenna peak power constraint is a very practical limitation to ensure the antenna working in its linear area. Based on this limitation, finite perturbations can be designed to redirect the GD based precoding to a better solution which can control the instantaneous power for each antenna.

In addition, PAPR reduction is a limitation to avoid introducing non-linear distortions, finite perturbations can be designed to redirect the GD based precoding to a better solution which can reduce PAPR for each antenna.

Moreover, amplitudes quantization is a limitation to reduce high hardware costs and power consumption by using low-resolution DACs at the BS, finite perturbations can be designed to redirect the GD based precoding to a better solution which can quantize the amplitudes of the precoded signals.

Some example embodiments of the present disclosure provide several GD based precodings with finite perturbations in massive MIMO. One GD based precoding with finite perturbations designed proper perturbations based on instantaneous per-antenna peak power constraint.

For instantaneous power limited scenario, the goal is to find a solution with limited amplitude. It is supposed that the maximum allowed amplitude is $\alpha^{max}$, the problem can be formulated represented by equation (40) as follows:

$$Gs = Hx \text{ subject to } \max|x| < \alpha^{max} \tag{40}$$

where the maximum amplitude of the solution x is limited by $\alpha^{max}$.

Influenced by these perturbations, the gradient descent steps would be redirected to the solutions which have lower peak-powers. After several epochs, the GD algorithm would converge to a suitable solution which meets the instantaneous per-antenna peak power constraint.

The SGD based precoding with adaptive descent clipping may be described as follows, for example:

---
Input:
   Signal vector s.
   Channel matrix H.
   SNR ρ (suppose all streams have the same SNR).
   Preprocessing matrix G (set as βI, where β is the empirical precoding factor to normalize the signal power).
Output:
   Precoded signal x.
Initialization:
   Set maximum iteration times n, 15 to 20 is OK.
   Set the regularization factor as aforementioned, λ can be set to 0 for non-regularized version.
   Set the learning rate η for SGD empirically, for example η = 1.0.
   Set the maximum times p ≤ n for clipping operation, for example, p = n.
   Set the clipping ratio μ empirically, for example, μ = √2.
Main routine:
   Calculate the scaled signal vector $\bar{s}$ using equation (35).
   For t = 1 to n:
     # Step 1: SGD based precoding
     For k = 1 to M:
       Calculate the error value $\delta_k$ using formula (36).
       Calculate the gradient vector $g_k$:

$$g_k = \delta_k H_k^H + \frac{\lambda}{M} x \quad (41)$$

Scale the gradient vector:

$$g_k = -\frac{1}{\|H_k\|_2^2 + \lambda/M} g_k \quad (42)$$

Update the estimated signal vector x using formula (39).
     # End of SGD based precoding algorithm
     # Step 2: Descent clipping
     If t < p: (Clipping operation would implement p − 1 iterations here)
       Calculate the average power of x:

$$\mathcal{P} = \frac{\|x\|^2}{N} \quad (43)$$

Use the given clipping ratio μ to compute the clipping threshold:

$$\zeta = \mu\sqrt{\mathcal{P}} \quad (44)$$

Calculate the adaptive descent factor:

$$\gamma = \frac{1}{1 + e^{-t}} \quad (45)$$

Clip the estimated signal vector:

$$x_j = \begin{cases} x_j, & \|x_j\| \leq \zeta \\ \frac{\gamma\zeta}{\|x_j\|} x_j, & \|x_j\| > \zeta \end{cases} \quad (46)$$

End of Descent clipping
Output: the precoded signal x.

---

It should be noticed that the clipping ratio μ is very important, it controls the fluctuations of the instantaneous power of the precoded signals x. It is supposed that μ=√2 will limit the instantaneous peak power of the precoded signals x to be less than or equal to twice of the averaged power of x. Assume the averaged power of x is $\bar{\mathcal{P}}$, then the maximum value of $\bar{\mathcal{P}}$ can be set as $(\alpha^{max}/\mu)^2$. Thus, it would be much easier for the power amplifier to work in its linear region, and the non-linear distortions would then be greatly reduced.

Another GD based precoding with finite perturbations is the simplified gradient descent (GD) based precoding discussed above, which combines look-ahead clipping with the GD based precoding to reduce PAPR of the MIMO-OFDM downlink system. It designed proper perturbations based on PAPR constraint. The look-ahead clipping introduces perturbations into the GD steps, and redirects the GD algorithm to a better solution with lower PAPR.

In addition, since GD based precoding scheme has a high flexibility, GD based precoding with finite perturbations can also be applied to quantized precoding problem in massive MIMO. It designed proper perturbations based on a quantized level.

Embodiments of the present disclosure provide a SGD based 1-bit precoding.

For example, a basic SGD based 1-bit precoding algorithm is described as follows.

---
Input:
   Signal vector s.
   Channel matrix H.
   Preprocessing matrix G (set as βI, where β is the empirical precoding factor to normalize the signal power P).
Output:
   Precoded signal x.
Initialization:
   Set max iteration times n, 25 or more is OK.
   Set the learning rate η for SGD empirically, such as η = 1.0.
   Set the scale factor τ for clipping empirically, for example, τ = 1.25.
Main routine:
   Calculate the scaled signal vector:
$$\bar{s} = GS \quad (35)$$
   For t = 1 to n:
     # Step 1: SGD based precoding
     For k = 1 to M:
       Calculate the error value:
$$\delta_k = H_k x - \bar{s}_k \quad (36)$$
       Calculate the gradient vector:η

$$g_k = -\frac{\delta_k}{\|H_k\|_2^2} H_k^H \quad (47)$$

Update the estimated signal vector:
$$x = x + \eta g_k \quad (39)$$
     # Step 2: Scaled clipping
     Compute the clipping threshold:

$$\zeta = \sqrt{\frac{\max(\|x\|^2, P)}{2N}} \quad (48)$$

Scale the estimated signal vector:
$$x = \tau x \quad (49)$$
     Clip the estimated signal vector:
$$x = \text{sgn}(R\{x\})\min(|R\{x\}|, \zeta) + j\text{sgn}(I\{x\})\min(|I\{x\}|, \zeta) \quad (50)$$
     Quantize the signal x by change the elements of x to the nearest quantizing level.
$$x = Q(x) \quad (51)$$
   Output: the precoded signal x.
End of SGD based quantized precoding algorithm

---

It is to be noted that elements of s, H and x are all complex values here.

Actually, the GD based precoding with finite perturbations can be used in many scenarios, practical limitations can be converted to perturbations by different operations, and then the perturbations will act as guides, which redirect the GD algorithm from the original solutions to better solutions. The key point is how to convert the requirements or limitations to finite well-designed perturbations. Generally, better conversion means better solution.

Accordingly, the transmitter 110 transmits, by the first number of antennas, the first number of signals in the second number of streams at block 240. The number of signals may be well precoded such that the receiver 120 can receive the signals correctly.

Figure 5:
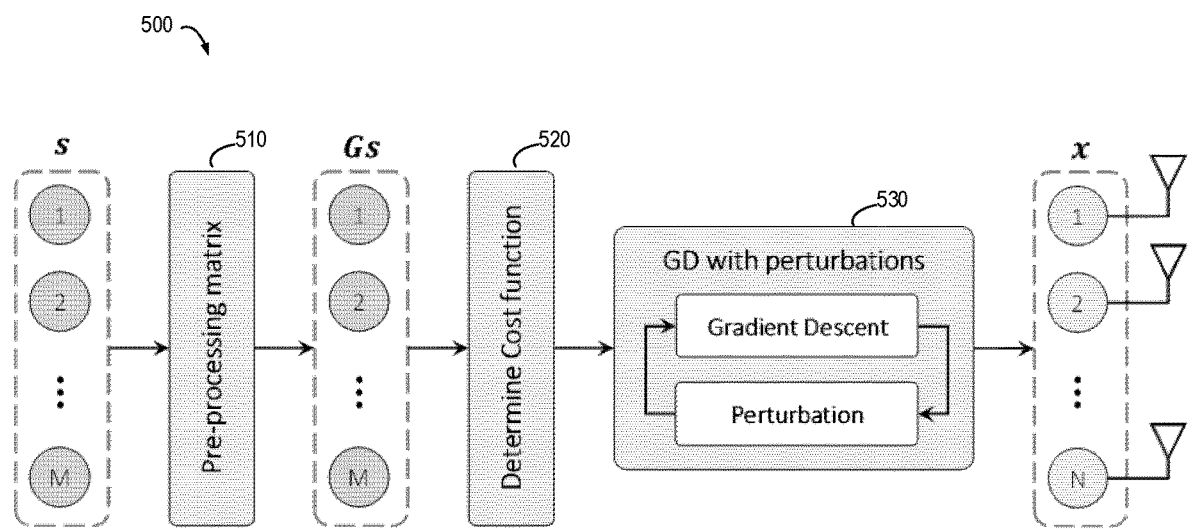
FIG. 5 shows an example for precoding of massive MIMO according to some example embodiments of the present disclosure.

FIG. 5 shows an example for GD based precoding with finite perturbations 500 according to some example embodiments of the present disclosure.

As shown in FIG. 5, the GD based precoding with finite perturbations 500 may comprise three main parts: determining pre-processing matrix G 510, determining cost function 520 and determining perturbations 530.

At 510, the pre-processing matrix G can be designed as a diagonal matrix or a non-diagonal matrix empirically or by specific designs. For example, the simplest pre-processing matrix is an identity matrix I, which means no space gains are added on the received signals at user sides. In practical systems, the pre-processing matrix is often designed as $\beta I$, where $\beta$ is the precoding factor to normalize the precoded signal power. For a diagonal pre-processing matrix G, the diagonal elements of the G are exactly the gains of signals received at user sides.

The pre-processing matrix can also be designed as a non-diagonal matrix to handle some practical issues. Generally, using a non-diagonal pre-processing matrix would introduce MUI into the precoding procedure. Conventional block-level precoding schemes often treat the MUI as a factor that should be mitigated. However, contrary to block-level precoding schemes, symbol-level precoding schemes often aim to control the MUIs to have constructive interferences which facilitate the correct detection of received symbols at user sides. Hence, the MUI can be utilized in the present disclosure to improve the detection performance.

Another proper way is designing the pre-processing matrix according to the channel matrix H. For example, designing the diagonal elements of G as the lengths of the row vectors in the channel matrix H (a scale factor is also needed to nonnalize the signal power). This design is quite reasonable because it is the optimal channel gains when the channel vectors in H are mutually orthogonal. If the channel vectors are not mutually orthogonal, some extra power is needed to remove the MUIs.

In addition, if the noise level can be estimated, the pre-processing matrix can also be designed according to the target SNRs at user sides. For example, suppose n is Gaussian white noise with zero mean and variance $\sigma_n^2$, and the target SNR for all streams is $\rho$. Since also suppose $\mathbb{E}[\|s_{i_l}\|^2]=1$ (i=1,2, ..., M) in this invention, the gain for all streams should be $\sqrt{\rho}\sigma_n$ to ensure the target SNR. Hence, the pre-processing matrix G can be designed as $\sqrt{\rho}\sigma_n I$. When the target SNRs are different for different streams and denote the target SNR for the kth stream as $p_k(1 \le k \le M)$, the kth diagonal element of the pre-processing matrix G can be designed as $\sqrt{\rho_k}\sigma_n$.

At 520, for the GD algorithm, the cost function design is critically important. Determining the cost function is the precondition of the GD algorithm. Mean square error (MSE) cost function is widely used in machine learning, it may be a measure of a difference between Gs and Hx in equation (17) when estimating the relationship between Gs and H in equation (17).

Regularizations can also be involved in the cost function design. L2-norm regularization, i.e.

$$\lambda \|x\|_2^2$$

is a common way for regularization. But it is not the unique way for regularization. Different regularizations can be adopted during cost function designs for different purposes. It should be noticed that some regularization approaches may change a cost function to be nonconvex, which may make the GD algorithm not converge or converge to local minima. Therefore, to ensure the fast convergence of the GD algorithm, convexity of the cost function should always be guaranteed.

At 530, for the massive MIMO precoding wherein the number of transmitting antennas at BS is much larger than the total number of receiving antennas at user sides, there are infinite solutions in the solution space of equation (17). The pre-processing matrix design and the cost function design can ensure that the GD algorithm would converge to a reasonable solution, but it cannot make full use of the potentials of the GD algorithm to exploit the redundant degrees-of-freedom of the massive MIMO system to obtain a better solution for practical issues.

Figure 6:
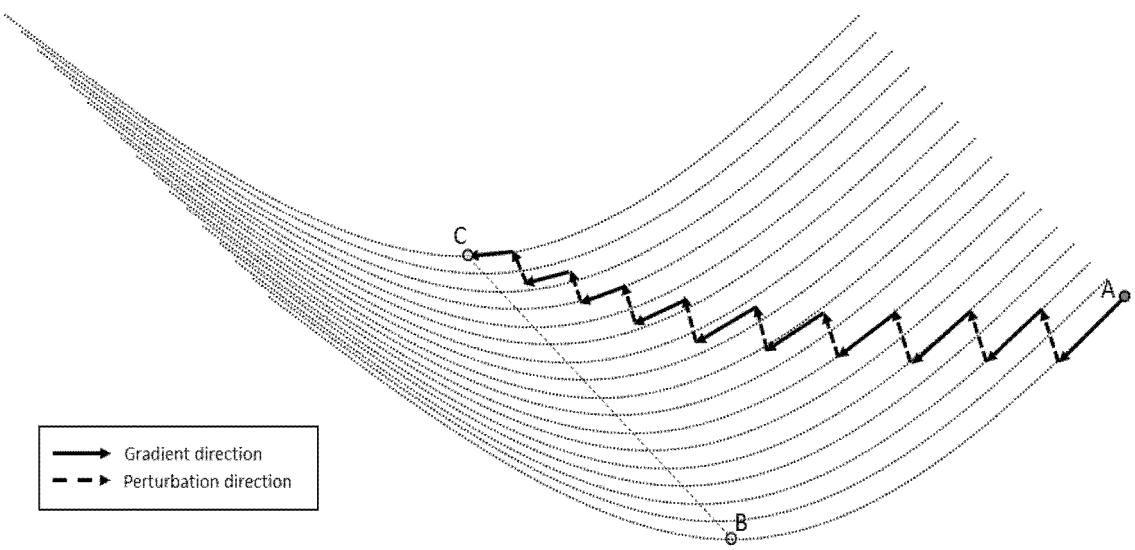
FIG. 6 shows an example for precoding of massive MIMO according to some example embodiments of the present disclosure.

In order to make full use of the potentials of the GD algorithm in the massive MIMO precoding scenario, perturbations are introduced to interrupt the gradient descent procedure and force the GD algorithm to converge to another solution. FIG. 6 shows a process of redirected gradient descent steps of the present disclosure. Point A is the initial point which locates outside the solution space, while points B and C are two solutions located in the solution space, expressed by the valley line. Without perturbations, the GD algorithm would converge to point B finally. When introducing perturbations into the gradient descent steps, the target solution would change, and the GD algorithm would spend more steps to converge to the new solution point C.

In order to meet practical requirements on the solutions of precoding problem, perturbations are introduced to force GD algorithm to converge to a better solution which satisfies the specific requirements. Clipping and its variations have been proven to be effective ways to introduce perturbations to redirect the GD algorithm in the discussion above and in massive MIMO-OFDM PAPR reductions (e.g. Simplified gradient descent (GD) based precoding). However, feasible operations are not limited to clipping-like methods, other activation functions in machine learning would also be suitable to introduce perturbations to redirect the GD procedure. Different requirements often lead to different perturbation designs, well-designed perturbations can redirect the GD algorithm to a better solution, which would in turn improve the performance related with the requirements.

In the embodiments of the present disclosure, a GD based precoding with finite perturbations is proposed to take advantage of the large degrees-of-freedom to meet different requirements in practical systems and meanwhile cover the traditional linear precoding methods. In addition, the GD based precoding has benefit on the computation efficiency due to the ANN's rapid development.

Further, for each epoch of the SGD based precoding, the computational complexity is relatively low than traditional precoding. Therefore, the GD based precoding scheme would be more attractive due to its linear increasing complexity.

In addition, the preprocessing matrix G can be designed flexibly. By using different preprocessing matrix G, the GD based precoding scheme can be used to implement different traditional precoding methods. For example, the GD based precoding scheme can be used to implement the normalized MF precoding by defining the preprocessing matrix as $G_{mf}=HH^H D_{mf}^{-1}$, and solve equation $G_{mf}s=Hx$ by the GD algorithm without regularization ($\lambda_k=0$, $1 \le k \le M$). Therefore, the normalized MF precoding can be covered by the GD based precoding scheme.

As another example, the normalized ZF precoding can be implemented by the GD based precoding in an analogous way by defining the preprocessing matrix as $G_{zf}=HH^H(HH^H)^{-1}D_{zf}=D_{zf}$, and then solve $G_{zf}s=Hx$ by the GD algorithm without regularization.

For the RZF precoding, the GD based implementation is more flexible. For example, the normalized RZF precoding can be implemented by the GD based precoding in two ways. One way is defining the preprocessing matrix as $G_{rzf}=HH^H(HH^H+\lambda I)^{-1}D_{rzf}$ and solving $G_{rzf}s=Hx$ by the GD algorithm without regularization. The other way is defining the preprocessing matrix as $D_{rzf}$, and solving $D_{rzf}s=Hx$ by the GD algorithm with regularization ($\lambda_k=\lambda$, $1 \le k \le M$).

In the following section, the performance of the SGD based precoding scheme, original zero forcing scheme (labelled by ZF), regularized zero forcing scheme (labelled by RZF) will be tested. Further split SGD base precoding scheme to several sub-methods: SGD based ZF precoding (labelled by SGD-ZF), SGD based RZF precoding (labelled by SGD-RZF), SGD based clip-guided ZF precoding (labelled by SGD-CZF) and SGD based clip-guided RZF precoding (labelled by SGD-CRZF).

For example, the Environment parameters may be set as: Modulation order: 16-QAM constellation Number of antennas: N=40 Number of streams: M=10

For the power amplifier (PA) on antennas, consider the precoded signals passing through a solid-state power amplifier (SSPA), which can be formulated by equation (44):

$$\check{x}(n) = \frac{x(n)}{(1+|x(n)|^{2q})^{1/2q}} a^{max} \qquad (44)$$

where $x(n)$ and $\check{x}(n)$ denote the input and output signals, $\alpha^{max}$ denotes the saturation voltage, which is the maximum amplitude allowed by the SSPA when working in the linear area, and q=3 for a practical SSPA.

Figure 7:
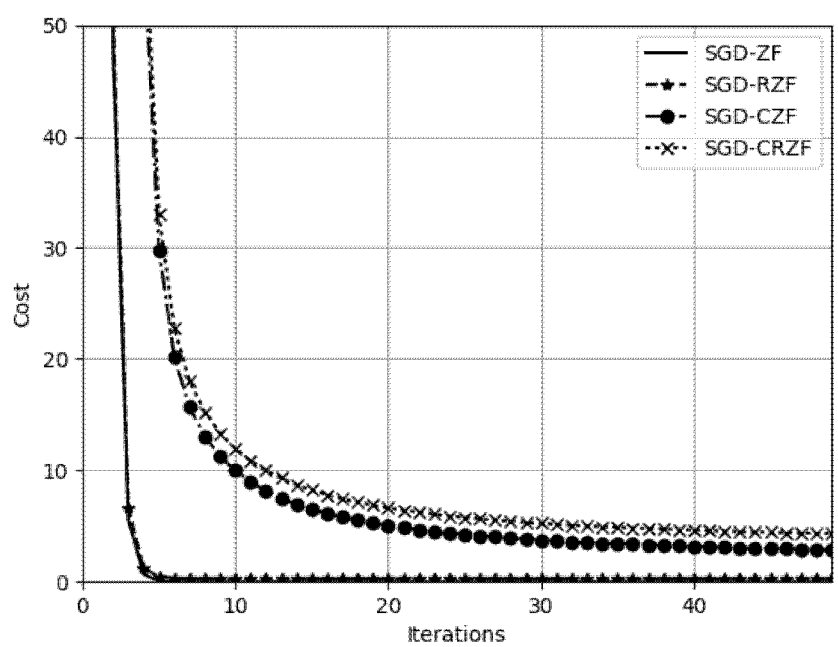
FIG. 7 shows an example for precoding of massive MIMO according to some example embodiments of the present disclosure.

FIG. 7 shows the convergence rate in accordance with the different schemes. Under SNR=0 dB condition, the sum cost of different methods based on SGD for 500 samples are plotted and shown in FIG. 7. As shown in FIG. 7, the SGD based precodings have fast convergences: both SGD-ZF and SGD-RZF can converge within 10 iterations, while SGD-CZF and SGD-CRZF need about 20 iterations to converge. The reason why SGD-CZF and SGD-CRZF need more iterations to converge is that the clipping operation interrupts and redirects the gradient descent steps. However, it brings the benefit that the solution has low peak-power at the price of more iterations.

Figure 8:
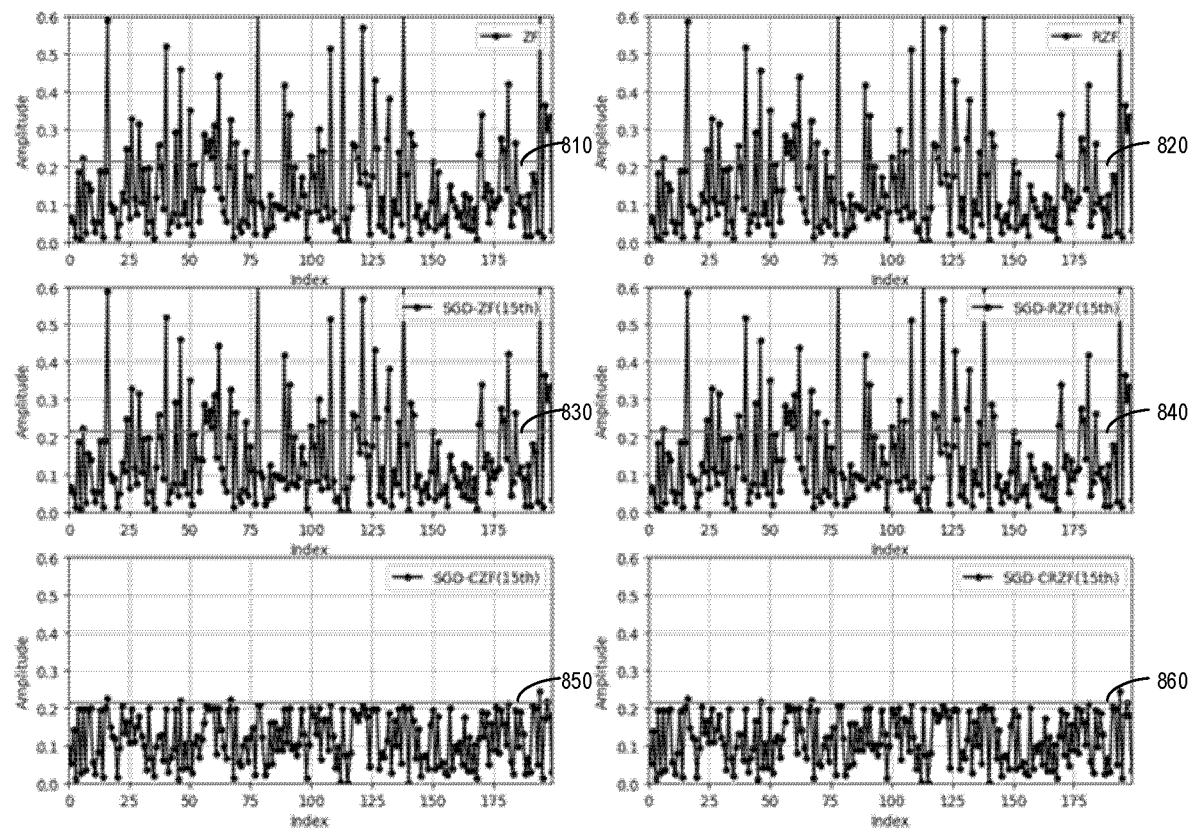
FIG. 8 shows an example for precoding of massive MIMO according to some example embodiments of the present disclosure.

The signals on the first antenna for different methods when SNR is 0 dB are plotted and shown in FIG. 8. Lines 810, 820, 830, 840, 850, 860 are the limitation of the amplitude of instantaneous power upon which the power amplifier would run into non-linear area. It is obvious that SGD-ZF has the same precoding result with ZF and SGD-RZF has the same precoding result with RZF. While for SGD-CZF and SGD-CRZF approaches, the instantaneous power of the signals is well-controlled. For ZF, RZF, SGD-ZF and SGD-RZF approaches, most instantaneous amplitudes are below 0.4, while for SGD-CZF and SGD-CRZF approaches, most instantaneous amplitudes are below 0.2.

Pass the precoded signals through the aforementioned SSPA, and then calculate the SERs for different methods in different SNR conditions. One symbol is said to be in error when it is decoded as another symbol in the constellation.

Figure 9:
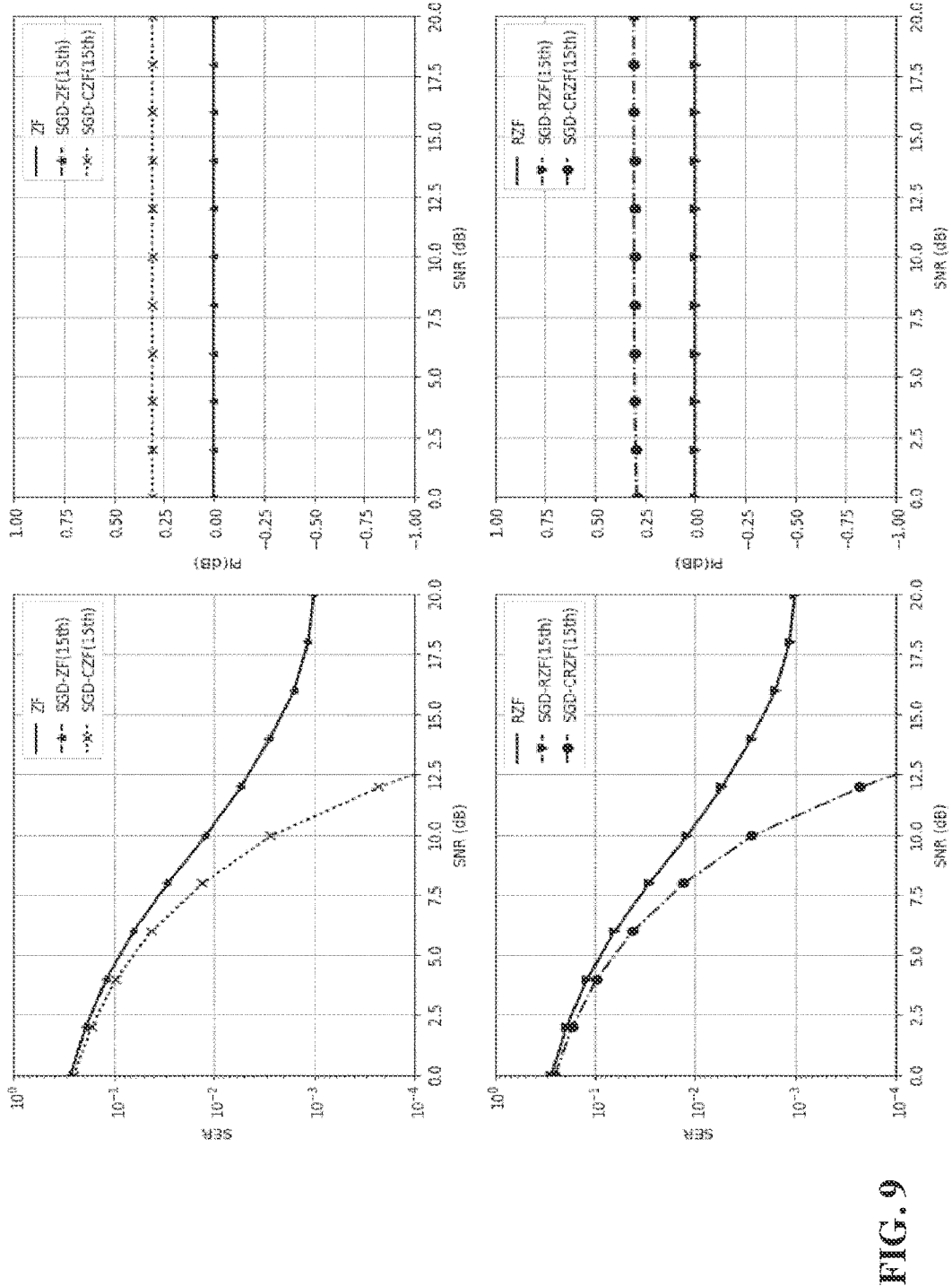
FIG. 9 shows an example for precoding of massive MIMO according to some example embodiments of the present disclosure.

As shown in FIG. 9, SGD-ZF and ZF get the same SER performance (two curves are overlapped) because they have the same solution. Similarly, SGD-RZF and RZF get almost the same SER performance. While for SGD-CZF and SGD-CRZF approaches, they get much better SERs than ZF and RZF. As shown in FIG. 8, both SGD-CZF and SGD-CRZF find better solutions which have lower peaks, thus non-linear distortions cause by SSPA is minimized. Therefore, the SER performances become better, especially when the SNR is high.

At the right of FIG. 9, the power increase (PI) is plotted. SGD-ZF and ZF have the same power consume, while SGD-CZF needs about 0.3 dB more power. This is the price paid for avoiding the non-linear distortion caused by SSPA. Similarly, SGD-RZF and RZF have almost the same power consume, while SGD-CRZF consumes about 0.3 dB more power.

Under SNR=10 dB condition, the effects of the number of transmit antennas are studied. Since there are 10 streams for transmitting, 10-100 transmit antennas are selected for this testing.

Figure 10:
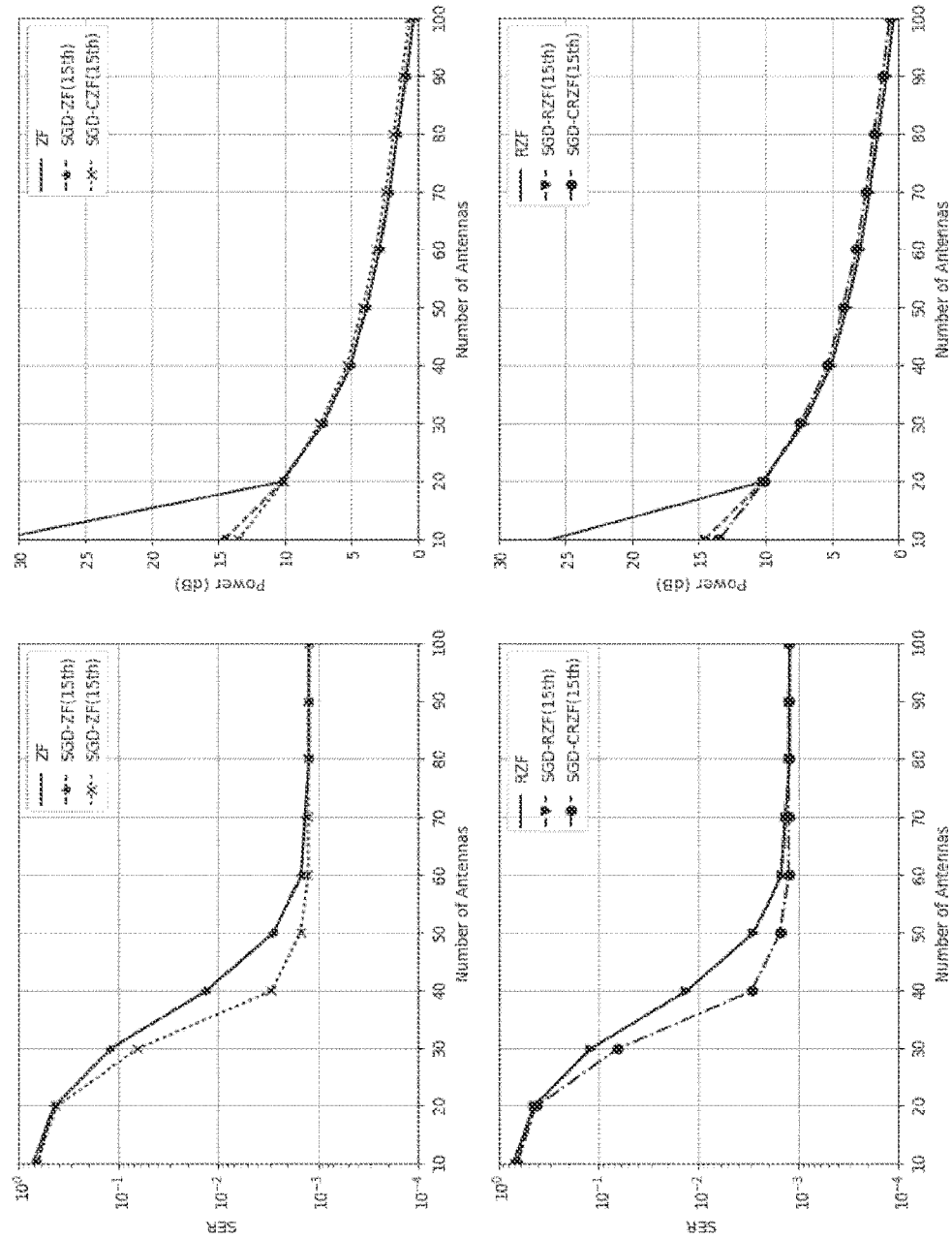
FIG. 10 shows an example for precoding of massive MIMO according to some example embodiments of the present disclosure.

As shown in the left of FIG. 10, SGD-ZF and ZF always have the same SER performances. Similarly, SGD-RZF and RZF have almost the same SER performance. SGD-CZF and SGD-CRZF get the best SER performance because they avoid the non-linear distortion caused by SSPA.

As shown in the right of FIG. 10, the power consume is plotted for all methods.

When the number of transmit antennas is relative small, both ZF and RZF consume much more power than SGD-ZF and SGD-RZF. Increasing the number of transmit antennas, the power consume are almost the same. But SGD-CZF and SGD-CRZF need a little more power to get the solution with lower peak-powers.

It should be noticed that with the increase of the number of transmit antennas, the total power consume on antennas are decreased. Thus, the peak powers of signals are also decreased which could help ZF, RZF, SGD-ZF and SGD-RZF to avoid the non-linear distortions. Fewer distortions would surely lead to better SER performance, that's why ZF and RZF get more benefits on SER performance with the increase of the number of transmit antennas.

Since SGD-CZF and SGD-CRZF solutions always have lower peak-powers, it is much easier for them to enhance the transmitter power without introducing too many non-linear distortions. While for traditional ZF and RZF methods, larger transmitter power often means more non-linear distortions due to their high peak-powers.

In addition, the performance of the SGD based 1-bit precoding scheme (labelled by SGD), original zero forcing using infinite-resolution DACs (labelled by ZF-inf), zero forcing followed by quantization (labelled by ZFQ) and the SQUID 1-bit precoder (labelled by SQUID) will be tested to show the advantages of GD based precoding scheme.

For example, the Environment parameters may be set as: Modulation order: QPSK constellation Number of antennas: N=40 Number of streams: M=10

Figure 11:
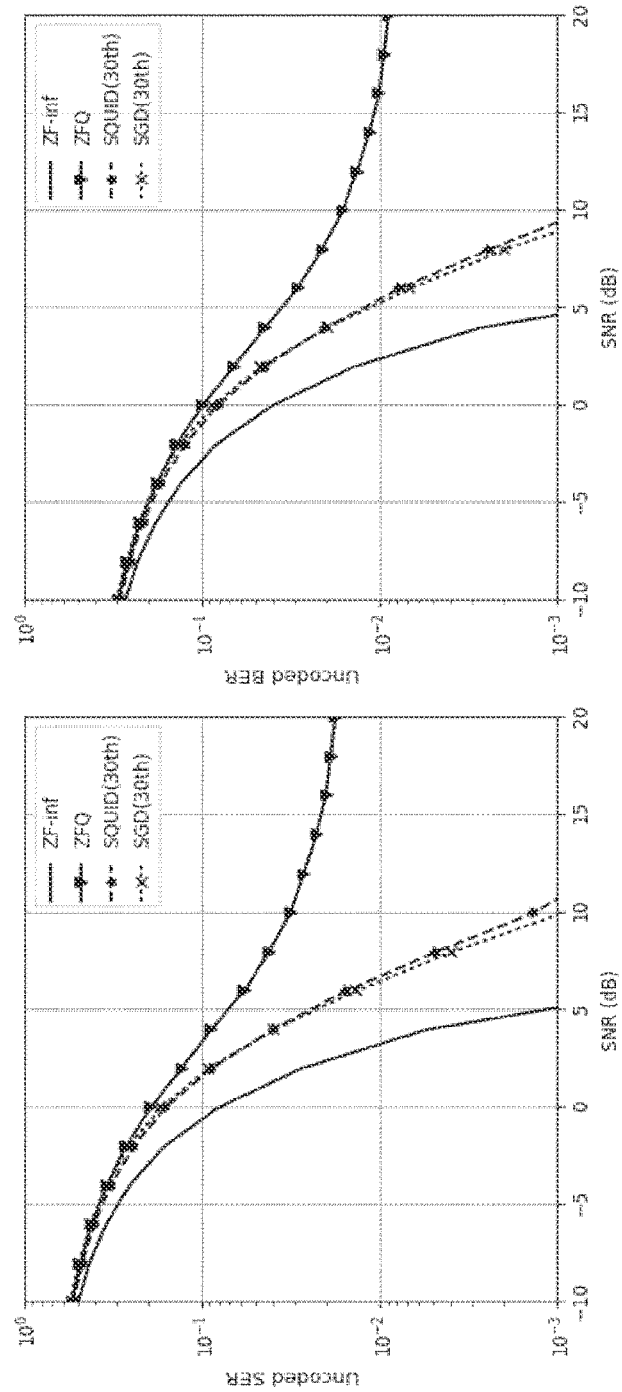
FIG. 11 shows an example for precoding of massive MIMO according to some example embodiments of the present disclosure.

The uncoded SER and BER of these schemes are plotted in FIG. 11. As shown in FIG. 11, ZFQ, as a typical linear-quantized precoding, gets the worst SER and BER performance. While ZF-inf gets the best performance, it is because quantization would import non-linear distortion, which would degrade the SER/BER performance. Even the optimal quantized precoding cannot get a better SER/BER performance than the ZF precoding with infinite-bit DACs.

Quantized precoding mitigates the high hardware costs and power consummation by introducing some distortions.

SGD based 1-bit precoding gets similar SER/BER performance with SQUID precoding, which has a near-optimal SER/BER performance of quantized precoding.

Hence, the high flexibility and extendibility of the SGD based precoding scheme has been proven in the 1-bit precoding application. Since GD algorithm has a lower complexity, it can be more efficient than SQUID and would be more attractive for the practical massive MIMO system.

By means of the above described test result for performance, the GD based precoding scheme has several distinct advantages as following:

Large coverage: traditional precoding schemes can be easily implemented by GD based precoding scheme.

High flexibility: it is easy to control the signal gains at the user side for each stream.

High extendibility: it is easy to extend the GD based precoding to meet different requirements for practical applications.

Easy to implement: it can be easily implemented by a simple linear neural network.

Profit from AI domain: can use ANN implemented in hardware (DSP, GPU, FPGA, NPU) easily, this can remove most computing consuming of CPU.

In some example embodiments, an apparatus capable of performing the method 200 (for example, a transmitter as shown in FIG. 1) may comprise means for performing the respective steps of the method 200. The means may be implemented in any suitable form. For example, the means may be implemented in a circuitry or software module.

In some example embodiments, the apparatus comprises: means for iteratively performing: determining a first number of signals to be transmitted by the first number of antennas in a second number of streams based on a second number of original signals, determining whether at least one feature of the first number of signals is to be regulated, and in response to determining that the at least one feature of the first number of signals is to be regulated, adjusting at least one of the first number of signals in order to regulate the at least one feature of the first number of signals; and means for transmitting, by the first number of antennas, the first number of signals in the second number of streams.

In some example embodiments, wherein means for determining the first number of signals comprises: means for determining a difference between the second number of original signals and the second number of received signals corresponding to the first number of signals; means for determining, based on the determined difference, a direction in which a descending rate of the determined difference is above a threshold rate; and means for updating the first number of signals to enable the determined difference to descent in the determined direction.

In some example embodiments, means for updating the first number of signals comprises: means for determining an update step size based on channel state information and a signal to noise ratio associated with the second number of streams; and means for updating the first number of signals to enable the determined difference to descent based on the update step size in the determined direction.

In some example embodiments, the apparatus further comprises: means for iteratively adjusting the first number of signals based on the respective original signals of the second number of original signals, wherein means for iteratively adjusting the first number of signals comprises: means for determining a difference between a kth received signal of the second number of received signals and a kth original signal of the second number of original signals, wherein k is greater than 0 and the kth received signal of the second number of received signals is to be received in a kth stream of the second number of streams; and means for updating the first number of signals based on the determined difference.

In some example embodiments, wherein the at least one feature of the first number of signals comprises power of the first number of signals, and means for adjusting the at least one of the first number of signals comprises: means for determining whether power of each of the first number of signals is out of a power range; and in response to determining that power of a signal of the first number of signals is out of the power range, means for adjusting the power of the signal of the first number of signals to be within the power range.

In some example embodiments, wherein the power range comprises an upper power limit determined based on average power of the first number of signals, and means for adjusting the power of the signal of the first number of signals comprises: in response to the power of the signal of the first number of signals being more than the upper power limit, means for reducing the power of the signal of the first number of signals to be less than the upper power limit based on a reduction factor.

In some example embodiments, means for determining the first number of signals comprises: means for iteratively adjusting the first number of signals based on the second number of original signals to reduce the power of the first number of signals.

In some example embodiments, wherein the first number of signals are orthogonal frequency division multiplexing signals, the at least one feature of the first number of signals comprises peak to average power ratio of the first number of signals, and means for adjusting the at least one of the first number of signals comprises: means for determining average power of the first number of signals; and means for determining an upper power limit based on the average power; means for determining whether power of each of the first number of signals is more than the upper power limit; and in response to the power of a signal of the first number of signals being more than the upper power limit, means for reducing the power of the signal of the first number of signals to be equal to or less than the upper power limit.

In some example embodiments, wherein the at least one feature of the first number of signals comprises amplitudes of the first number of signals, and means for adjusting the at least one of the first number of signals comprises: means for adjusting an amplitude of the at least one of the first number of signals based on a quantized level.

Figure 12:
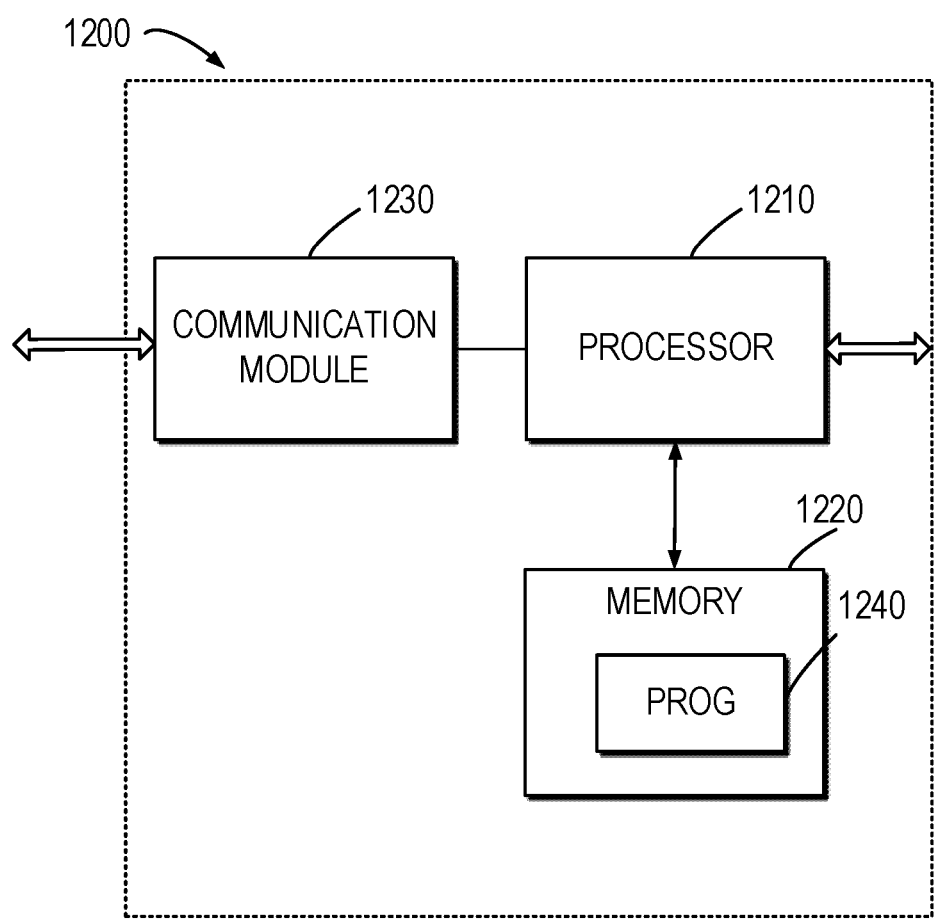
FIG. 12 is a simplified block diagram of a device that is suitable for implementing example embodiments of the present disclosure.

FIG. 12 is a simplified block diagram of a device 1200 that is suitable for implementing embodiments of the present disclosure. The device 1200 can be implemented at the transmitter 110 as shown in FIG. 1.

As shown, the device 1200 includes a processor 1210, a memory 1220 coupled to the processor 1210, a communication module 1230 coupled to the processor 1210, and a communication interface (not shown) coupled to the communication module 1230. The memory 1220 stores at least a program 1240. The communication module 1230 is for bidirectional communications, for example, via multiple antennas. The communication interface may represent any interface that is necessary for communication.

The program 1240 is assumed to include program instructions that, when executed by the associated processor 1210, enable the device 1200 to operate in accordance with the embodiments of the present disclosure, as discussed herein with reference to FIGS. 1 to 5. The embodiments herein may be implemented by computer software executable by the processor 1210 of the device 1200, or by hardware, or by a combination of software and hardware. The processor 1210 may be configured to implement various embodiments of the present disclosure.

The memory 1220 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1220 is shown in the device 1200, there may be several physically distinct memory modules in the device 1200. The processor 1210 may be of any type suitable to the local technical network, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

All operations and features as described above with reference to FIGS. 1 to 5 are likewise applicable to the device 1200 and have similar effects. For the purpose of simplification, the details will be omitted.

Generally, various embodiments of the present disclosure may be implemented in hardware or special purpose circuits, software, logic or any combination thereof Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 as described above with reference to FIGS. 1 to 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of signal precoding at a transmitter comprising a first number of transmitting antennas, the method comprising:
   iteratively performing:
      determining a first number of signals to be transmitted by the first number of antennas in a second number of streams based on a second number of original signals,
      determining whether at least one feature of the first number of signals is to be regulated, and
      in response to determining that the at least one feature of the first number of signals is to be regulated, adjusting at least one of the first number of signals in order to regulate the at least one feature of the first number of signals; and transmitting, by the first number of antennas, the first number of signals in the second number of streams,
wherein determining the first number of signals comprises
determining a difference between the second number of original signals and the second number of received signals corresponding to the first number of signals,
determining, based on the determined difference, a direction in which a descending rate of the determined difference is above a threshold rate, and
updating the first number of signals to enable the determined difference to descent in the determined direction.

2. The method of claim 1, wherein updating the first number of signals comprises:
determining an update step size based on channel state information and a signal to noise ratio associated with the second number of streams; and
updating the first number of signals to enable the determined difference to descent based on the update step size in the determined direction.

3. The method of claim 1, further comprising:
iteratively adjusting the first number of signals based on the respective original signals of the second number of original signals, wherein iteratively adjusting the first number of signals comprises:
determining a difference between a kth received signal of the second number of received signals and a kth original signal of the second number of original signals, wherein k is greater than 0 and the kth received signal of the second number of received signals is to be received in a kth stream of the second number of streams; and
updating the first number of signals based on the determined difference.

4. The method of claim 1, wherein the at least one feature of the first number of signals comprises amplitudes of the first number of signals, and adjusting the at least one of the first number of signals comprises:
adjusting an amplitude of the at least one of the first number of signals based on a quantized level.

5. A computer program embodied on a non-transitory computer readable storage medium, said computer program comprising program instructions which, when executed by a processor of a transmitter, cause the transmitter to perform the method of claim 1.

6. A method of signal precoding at a transmitter comprising a first number of transmitting antennas, the method comprising:
iteratively performing:
determining a first number of signals to be transmitted by the first number of antennas in a second number of streams based on a second number of original signals,
determining whether at least one feature of the first number of signals is to be regulated, and
in response to determining that the at least one feature of the first number of signals is to be regulated, adjusting at least one of the first number of signals in order to regulate the at least one feature of the first number of signals, and
transmitting, by the first number of antennas, the first number of signals in the second number of streams,
wherein the at least one feature of the first number of signals comprises at least one of power of the first number of signals and peak to average power ratio of the first number of signals, and adjusting the at least one of the first number of signals comprises:

determining whether power of each of the first number of signals is out of a power range; and
in response to determining that power of a signal of the first number of signals is out of the power range, adjusting the power of the signal of the first number of signals to be within the power range.

7. The method of claim 6, wherein the power range comprises an upper power limit, and adjusting the power of the signal of the first number of signals comprises:
determining average power of the first number of signals;
determining the upper power limit based on the average power;
determining whether power of each of the first number of signals is more than the upper power limit; and
in response to the power of the signal of the first number of signals being more than the upper power limit, reducing the power of the signal of the first number of signals to be equal to or less than the upper power limit based on a reduction factor.

8. The method of claim 7, wherein the at least one feature of the first number of signals comprises the power of the first number of signals, and determining the first number of signals comprises:
iteratively adjusting the first number of signals based on the second number of original signals to reduce the power of the first number of signals.

9. A transmitter for signal precoding, comprising:
a first number of antennas;
at least one processor; and
at least one memory including computer program codes;
the at least one memory and the computer program codes being configured to, with the at least one processor, cause the transmitter to:
iteratively perform:
determining a first number of signals to be transmitted by the first number of antennas in a second number of streams based on a second number of original signals,
determining whether at least one feature of the first number of signals is to be regulated, and
in response to determining that the at least one feature of the first number of signals is to be regulated, adjusting at least one of the first number of signals in order to regulate the at least one feature of the first number of signals; and
transmit, by the first number of antennas, the first number of signals in the second number of streams,
wherein the transmitter is caused to determine the first number of signals by:
determining a difference between the second number of original signals and the second number of received signals corresponding to the first number of signals,
determining, based on the determined difference, a direction in which a descending rate of the determined difference is above a threshold rate, and
updating the first number of signals to enable the determined difference to descent in the determined direction.

10. The transmitter of claim 9, wherein the transmitter is caused to update the first number of signals by:
determining an update step size based on channel state information and a signal to noise ratio associated with the second number of streams; and
updating the first number of signals to enable the determined difference to descent based on the update step size in the determined direction.

11. The transmitter of claim 9, wherein the transmitter is further caused to:
  iteratively adjust the first number of signals based on the respective original signals of the second number of original signals, wherein iteratively adjusting the first number of signals comprises:
  determine a difference between a kth received signal of the second number of received signals and a kth original signal of the second number of original signals, wherein k is greater than 0 and the kth received signal of the second number of received signals is to be received in a kth stream of the second number of streams; and
  update the first number of signals based on the determined difference.

12. A transmitter for signal precoding, comprising:
  a first number of antennas;
  at least one processor; and
  at least one memory including computer program codes;
  the at least one memory and the computer program codes being configured to, with the at least one processor, cause the transmitter to:
  iteratively perform:
    determining a first number of signals to be transmitted by the first number of antennas in a second number of streams based on a second number of original signals,
    determining whether at least one feature of the first number of signals is to be regulated, and
    in response to determining that the at least one feature of the first number of signals is to be regulated, adjusting at least one of the first number of signals in order to regulate the at least one feature of the first number of signals; and
  transmit, by the first number of antennas, the first number of signals in the second number of streams,
  wherein the at least one feature of the first number of signals comprises at least one of power of the first number of signals and peak to average power ratio of the first number of signals, and the transmitter is caused to adjust the at least one of the first number of signals by:
  determining whether power of each of the first number of signals is out of a power range; and
  in response to determining that power of a signal of the first number of signals is out of the power range, adjusting the power of the signal of the first number of signals to be within the power range.

13. The transmitter of claim 12, wherein the power range comprises an upper power limit, and the transmitter is caused to adjust the power of the signal of the first number of signals by:
  determining average power of the first number of signals;
  determining the upper power limit based on the average power;
  determining whether power of each of the first number of signals is more than the upper power limit; and
  in response to the power of the signal of the first number of signals being more than the upper power limit, reducing the power of the signal of the first number of signals to be equal to or less than the upper power limit based on a reduction factor.

14. The transmitter of claim 13, wherein the at least one feature of the first number of signals comprises the power of the first number of signals, and the transmitter is caused to determine the first number of signals by:
  iteratively adjusting the first number of signals based on the second number of original signals to reduce the power of the first number of signals.

15. The transmitter of claim 9, wherein the at least one feature of the first number of signals comprises amplitudes of the first number of signals, and the transmitter is caused to adjust the at least one of the first number of signals by:
  adjusting an amplitude of the at least one of the first number of signals based on a quantized level.

* * * * *